United States Patent
Nakayama

(10) Patent No.: US 9,319,691 B2
(45) Date of Patent: Apr. 19, 2016

(54) IMAGE CODING DEVICE AND IMAGE CODING METHOD

(71) Applicant: SAMSUNG DISPLAY CO., LTD., Yongin, Gyeonggi-Do (KR)

(72) Inventor: Shintaro Nakayama, Yokohama (JP)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/478,026

(22) Filed: Sep. 5, 2014

(65) Prior Publication Data

US 2015/0071559 A1 Mar. 12, 2015

(30) Foreign Application Priority Data

Sep. 6, 2013 (JP) .................................. 2013-185124

(51) Int. Cl.
| | |
|---|---|
| G06K 9/46 | (2006.01) |
| H04N 19/126 | (2014.01) |
| H04N 19/593 | (2014.01) |
| H04N 19/12 | (2014.01) |
| H04N 19/186 | (2014.01) |
| H04N 19/154 | (2014.01) |
| H04N 19/182 | (2014.01) |
| H04N 19/423 | (2014.01) |

(52) U.S. Cl.
CPC ............. *H04N 19/126* (2014.11); *H04N 19/12* (2014.11); *H04N 19/154* (2014.11); *H04N 19/182* (2014.11); *H04N 19/186* (2014.11); *H04N 19/593* (2014.11); *H04N 19/423* (2014.11)

(58) Field of Classification Search
USPC ........... 382/232, 233, 236, 239, 279; 358/1.2; 375/240.13, E7.206, E7.094
See application file for complete search history.

(56) References Cited

U.S. PATENT DOCUMENTS

| | | | |
|---|---|---|---|
| 6,256,347 B1 * | 7/2001 | Yu et al. .................. | 375/240.13 |
| 6,690,834 B1 * | 2/2004 | Le Cornec ................ | 382/236 |
| 7,809,200 B2 * | 10/2010 | Aguilar ...................... | 382/232 |

FOREIGN PATENT DOCUMENTS

| | | |
|---|---|---|
| JP | 08-316843 | 11/1996 |
| JP | 10-327403 | 12/1998 |
| JP | 2006-508590 A | 3/2006 |
| JP | 2006-115483 a | 4/2006 |
| JP | 2010-011386 | 1/2010 |

* cited by examiner

*Primary Examiner* — Anh Do
(74) *Attorney, Agent, or Firm* — Lee & Morse, P.C.

(57) ABSTRACT

An image coding device includes a first block encoder and a second block encoder. The first block encoder compresses input pixel values including first and second input pixel values in a block. The first input pixel value is located at a first position of the block, and the second input pixel value is located at a second position of the block. The second block encoder compresses the input pixel values by the unit block. The first and second block encoders compare the input pixel values based on different methods of compression. The first block encoder outputs the first input pixel value as a first compressed pixel value, and compresses the second input pixel value to a second compressed pixel value.

20 Claims, 20 Drawing Sheets

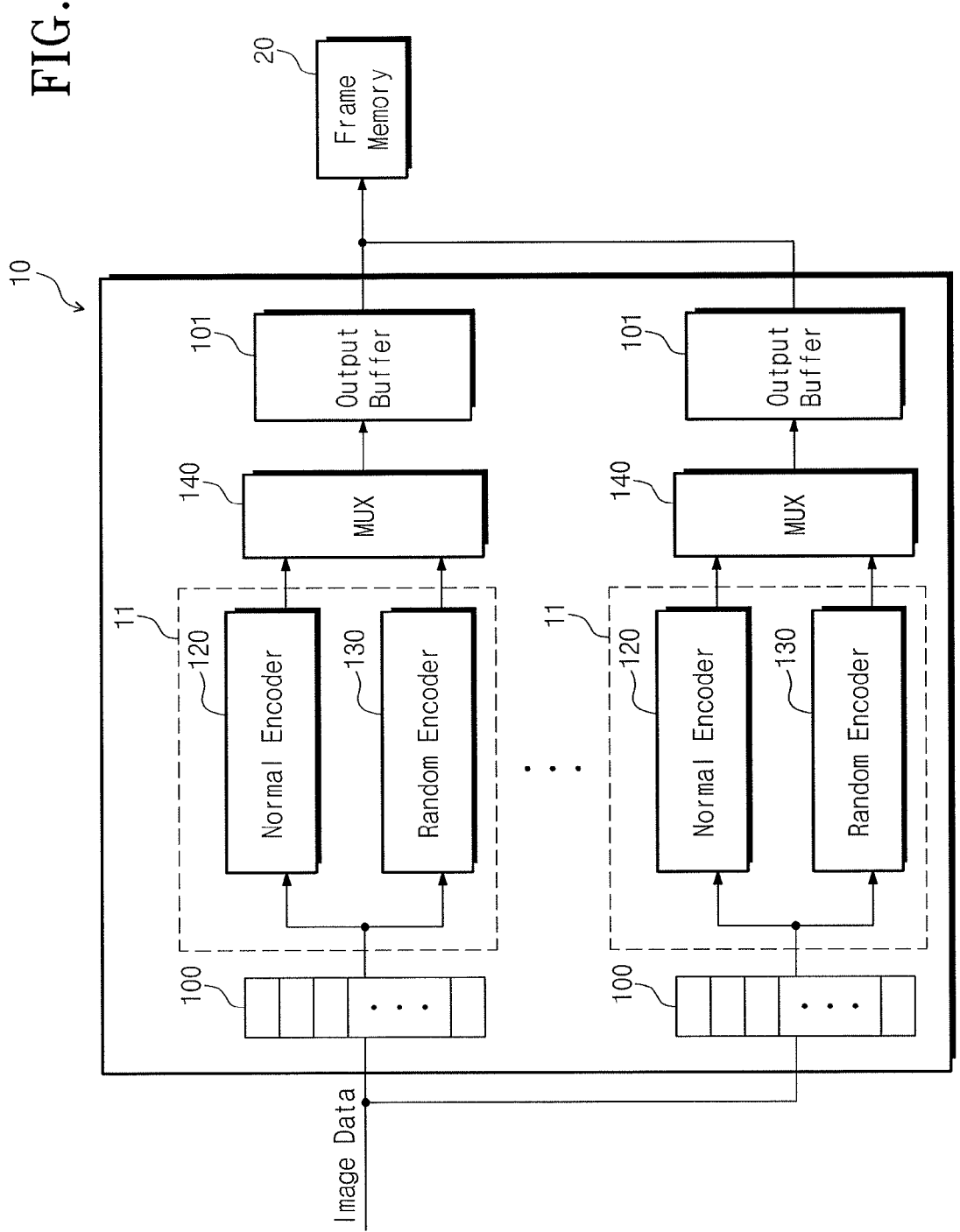

FIG. 19A

[4-Bit Quantization Table]

| Input Range | | Quantization Value | De-Quantization Value |
|---|---|---|---|
| 0 | 8 | 0 | 0 |
| 9 | 25 | 1 | 17 |
| 26 | 42 | 2 | 34 |
| 43 | 59 | 3 | 51 |
| 60 | 76 | 4 | 68 |
| 77 | 93 | 5 | 85 |
| 94 | 110 | 6 | 102 |
| 111 | 127 | 7 | 119 |
| 128 | 144 | 8 | 136 |
| 145 | 161 | 9 | 153 |
| 162 | 178 | 10 | 170 |
| 179 | 195 | 11 | 187 |
| 196 | 212 | 12 | 204 |
| 213 | 229 | 13 | 221 |
| 230 | 246 | 14 | 238 |
| 247 | 255 | 15 | 255 |

FIG. 19B

[3-Bit Quantization Table]

| Input Range | | Quantization Value | De-Quantization Value |
|---|---|---|---|
| 0 | 17 | 0 | 0 |
| 18 | 53 | 1 | 36 |
| 54 | 89 | 2 | 72 |
| 90 | 125 | 3 | 108 |
| 126 | 161 | 4 | 144 |
| 162 | 197 | 5 | 180 |
| 198 | 233 | 6 | 216 |
| 234 | 255 | 7 | 255 |

FIG. 20A

2-Bit Quantization Table (Normal Encoder)

| Input Range | | Quantization Value | De-Quantization Value |
|---|---|---|---|
| −255 | −3 | 2 | −4 |
| −2 | 1 | 0 | 0 |
| 2 | 9 | 1 | 4 |
| 10 | 255 | 3 | 16 |

FIG. 20B

3-Bit Quantization Table (Normal Encoder)

| Input Range | | Quantization Value | De-Quantization Value |
|---|---|---|---|
| −255 | −11 | 6 | −16 |
| −10 | −3 | 4 | −4 |
| −2 | −1 | 2 | −1 |
| 0 | 0 | 0 | 0 |
| 1 | 2 | 1 | 1 |
| 3 | 9 | 3 | 4 |
| 10 | 23 | 5 | 16 |
| 24 | 255 | 7 | 32 |

FIG. 21A

2-Bit Quantization Table (Random Encoder)

| Input Range | | Quantization Value | De-Quantization Value |
|---|---|---|---|
| -255 | -9 | 2 | -16 |
| -8 | 7 | 0 | 0 |
| 8 | 23 | 1 | 16 |
| 24 | 255 | 3 | 32 |

FIG. 21B

3-Bit Quantization Table (Random Encoder)

| Input Range | | Quantization Value | De-Quantization Value |
|---|---|---|---|
| -255 | -25 | 6 | -32 |
| -24 | -11 | 4 | -16 |
| -10 | -3 | 2 | -4 |
| -2 | 1 | 0 | 0 |
| 2 | 9 | 1 | 4 |
| 10 | 23 | 3 | 16 |
| 24 | 47 | 5 | 32 |
| 48 | 255 | 7 | 64 |

```
if(q == 0) {
        w = 0 ;
} else if (q == (1 << b)-1) {
        w = 255 ;                          —70
} else {
        w = (q << (8-b))|(1 << (8-b-1));
}
```

IMAGE CODING DEVICE AND IMAGE CODING METHOD

CROSS-REFERENCE TO RELATED APPLICATION

Japanese Application No. 2013-185124, filed on Sep. 6, 2013, and entitled, "Image Coding Device and Image Coding Method," is incorporated by reference herein in its entirety.

BACKGROUND

1. Field

One or more embodiments described herein relate to an image coding device and method.

2. Description of the Related Art

A display panel may be driven using a frame memory that has a capacity corresponding to the number of pixels in the panel and the number of values in a predetermined gray scale range. The quality of the display panel may be improved by increasing its resolution. However, as resolution increases, the capacity and cost of the frame memory may increase. This is especially true for display panels in handheld phones and a smart phones.

Various approaches have been developed in an attempts to reduce the cost of operating a display panel. One approach involves reducing the capacity of the frame memory. However, this approach limits resolution.

Another approach involves reusing a portion of the frame memory. This may be accomplished by dividing an image into blocks of a predetermined length, and then performing compression and de-compression on the block. However, block noise may be introduced which may have an adverse effect on display quality.

SUMMARY

In accordance with one embodiment, an image coding device includes a first block encoder to compress a plurality of input pixel values including first and second input pixel values in a unit of a block, the first input pixel value provided at a head of the block and the second input pixel value following the first input pixel value within the block, wherein the first block encoder includes a first encoder to output the first input pixel value as a first compressed pixel value and to compress the second input pixel value to a second compressed pixel value, and wherein the second compressed pixel value has fewer bits than the first input pixel value.

In accordance with another embodiment, an image coding device includes a first block encoder to compress a plurality of input pixel values including first and second input pixel values in a unit of a block, the first input pixel value provided at a head of the block and the second input pixel value following the first input pixel value within the block, wherein the first block encoder includes a second encoder adapted to compress the first input pixel value to a first compressed pixel value, wherein a first encoder is to compress the second input pixel value to a second compressed pixel value, and the second compression pixel value has fewer bits than the first compressed pixel value.

The first encoder may quantize a difference between the second input pixel value and a reference pixel value. The reference pixel value may include a de-compressed pixel value obtained by de-compressing the first compressed pixel value. The first encoder may directly quantize the second input pixel value.

The device may include a second block encoder to compress the input pixel values by the unit of the block in a manner different from the first block encoder; and a first multiplexer to compare an error between a first de-compressed pixel value and the input pixel values with an error between a second de-compressed pixel value and the input pixel values, the first multiplexer to select and output a compressed pixel value from one of the first or second block encoders that provides a predetermined error, wherein the first de-compressed pixel value is compressed and de-compressed through the first block encoder, and wherein the second de-compressed pixel value is compressed and de-compressed through the second block encoder.

The first block encoder may include a plurality of first encoders to compress the second input pixel value in different ways, and to output the compressed results as second compressed pixel values; and a second multiplexer to calculate errors between second de-compressed pixel values and the second input pixel values, to compare the errors, and to select and output a second compressed pixel value output from one of the first encoders providing a predetermined error, wherein the de-compressed pixel values are to be generated by de-compressing the second compressed pixel values.

The input pixel values may include a third input pixel value, and the second block encoder may include a plurality of third encoders to compress the third input pixel value in different ways, and to output the compressed results as third compression pixel values, a third multiplexer to calculate errors between third de-compressed pixel values and the third input pixel values, to compare the errors, and to select and output a third compressed pixel value output from one of the third encoders providing a predetermined error, third de-compressed pixel values are generated by de-compressing the third compression pixel values from the third encoders.

In accordance with another embodiment, a method for coding a plurality of input pixel values in a unit of a block includes outputting a first input pixel value as a first compressed pixel value; and compressing a second input pixel value to a second compressed pixel value, wherein second compressed pixel value has fewer bits than the first compressed pixel value and wherein the first input pixel value is at a head of the block and the second input pixel value follows the first input pixel value within the block.

In accordance with another embodiment, a method for coding a plurality of input pixel values in a unit of a block includes compressing a first input pixel value to a first compressed pixel value; and compressing a second input pixel value to a second compressed pixel value, wherein the second compressed pixel value has fewer bits than the first compressed pixel value.

In accordance with another embodiment, an image coding device includes a first block encoder to compress input pixel values including first and second input pixel values in a block, the first input pixel value at a first position of the block and the second input pixel value at a second position of the block; and a second block encoder to compress the input pixel values by the unit block, wherein the first and second block encoders are to compare the input pixel values based on different methods of compression, and wherein the first block encoder is to output the first input pixel value as a first compressed pixel value and to compress the second input pixel value to a second compressed pixel value. The second compressed pixel value may have fewer bits than the first input pixel value.

The device may include a first multiplexer to compare an error between a first de-compressed pixel value and the input pixel values with an error between a second de-compressed pixel value and the input pixel values, wherein the first multiplexer is to select and output a compressed pixel value from one of the first or second block encoders that provides a predetermined error. The first de-compressed pixel value may be compressed and de-compressed through the first block encoder, and the second de-compressed pixel value may be compressed and de-compressed through the second block encoder. The first block encoder may quantize a difference between the second input pixel value and a reference pixel value. The reference pixel value may include a de-compressed pixel value obtained by de-compressing the first compressed pixel value.

The first block encoder may directly quantize the second input pixel value. The first block encoder may include a plurality of first encoders to compress the second input pixel value in different ways, and to output the compressed results as second compressed pixel values; and a second multiplexer to calculate errors between second de-compressed pixel values and the second input pixel values, to compare the errors, and to select and output a second compressed pixel value output from one of the first encoders providing a predetermined error. The de-compressed pixel values may be generated by de-compressing the second compressed pixel values. The first position may be at a head position of the block, and the second position may be after the first position within the block.

BRIEF DESCRIPTION OF THE DRAWINGS

Features will become apparent to those of skill in the art by describing in detail exemplary embodiments with reference to the attached drawings in which:

FIG. 2A illustrates an embodiment of a compressor.

FIGS. 19A and 19B illustrate an example of quantization tables to be used to perform direct quantization which by a random encoder;

FIGS. 20A and 20B illustrate an example of quantization tables used to be used to perform differential quantization by a normal encoder;

FIGS. 21A and 21B illustrate an example of quantization tables to be used to perform differential quantization by a normal encoder;

FIG. 22 illustrates an embodiment of a shift method; and

DETAILED DESCRIPTION

Figure 1:
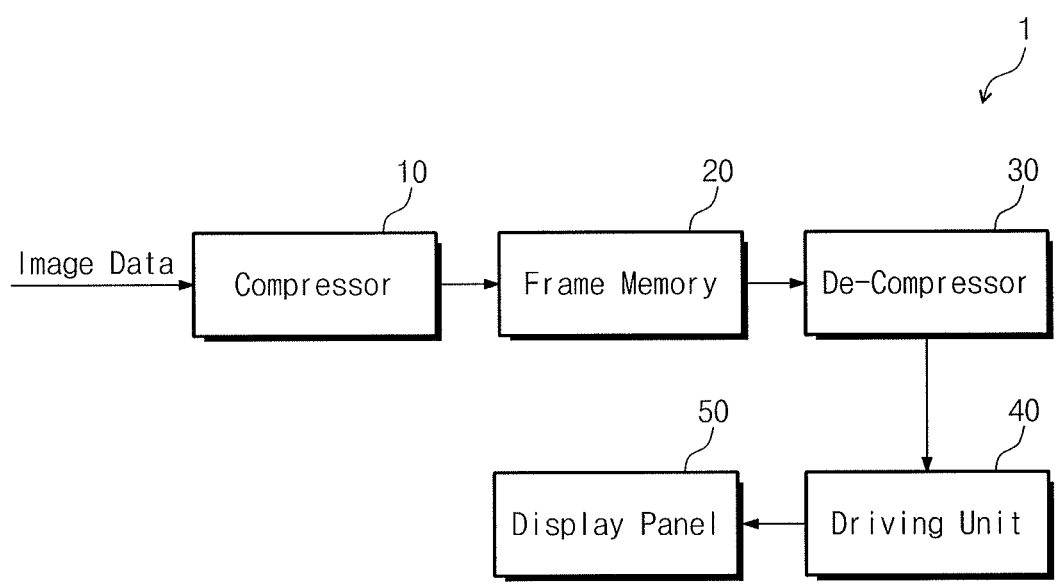
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a display 1, which, for example, may be used in a smart phone, a handheld telephone, a personal computer, or a television. The display device 1 may be any one of a variety of display devices including but not limited to an organic EL display or a liquid crystal display.

The display device 1 includes a compressor 10, a frame memory 20, a de-compressor 30, a driving unit 40, and a display panel 50. All or some of these features may be controlled by programs or hardware, software to be executed by a central processing unit or another type of processing device (CPU), or a combination thereof.

The display panel 50 has a plurality of pixels (e.g., in an m-by-n matrix). Each pixel may include a predetermined number of sub-pixels, e.g., red, green, and blue sub-pixels. Input pixel values indicating image data to be provided to pixels are provided to the display device 1, and an image corresponding to the input pixel values is displayed through the display panel 50.

The input pixel values may be expressed by a predetermined number of bits, e.g., 24 bits. That is, the input pixel values may be expressed, for example, using 24-bit quantization. The input pixel values may include, for example, red data, green data, and blue data corresponding to a red image, a green image, and a blue image respectively. Each of the red data, green data, and blue data may be expressed by a predetermined number (e.g., eight) of bits. In another embodiment, the input pixel values may be expressed using less than 24 bits (e.g., 18 bits and so on) or more than 24 bits (e.g., 30 bits, 48 bits).

Referring to FIG. 1, the input pixel values are compressed by the compressor 10, and the compressed pixel values are stored in the frame memory 20.

Input pixel values may be compressed by the block. The block may have input pixel values for a predetermined number of pixels, e.g., 16 pixels. When a portion of a frame memory is reused (e.g., in a display panel of a handheld device), the input pixel values are divided into blocks, each having a predetermined length. Compression and de-compression are then performed by on a block-by-block basis.

In one embodiment, one block includes input pixel values corresponding to 16 pixels and data is processed on a block-by-block basis. In another embodiment, one block may include eight pixels, four pixels, or less pixels, or may include more than 16 pixels including but not limited to 32 pixels.

In one embodiment, input pixel values in one block having 384 bits (i.e., 24 bits by 16 pixels) are compressed into 192 bits. That is, compression may be performed so that the capacity of compressed pixel values is half the capacity of the input pixel values. In other embodiments, a different compression ratio may be used.

Compression pixel values stored in the frame memory 20 may be de-compressed through the de-compressor 30 on a block-by-block basis.

The driving unit 40 drives the display panel 50 using the de-compressed pixel value(s). The driving unit 40 may include, for example, a driver circuit that controls the pixels to display an image with gray scale values that are based on the de-compressed pixel values. Thus, an image based on the de-compressed pixel values is displayed on the display panel 50.

FIG. 2A illustrates an embodiment of a compressor, and FIG. 2A illustrates that the compressor 10 includes a plurality of encoder units 11. In this example, the compressor 10 includes 16 encoder units 11 that correspond to 16 input pixel values that form one block. The encoder units 11 compress 16 input pixel values, respectively. In other embodiment, the compression 10 may include a different number of encoder units 11 that correspond to a different number of input pixel values per block.

Also, in this embodiment, the capacity of compressed pixel values is half the capacity of the input pixel values. In other embodiments, the capacity of the compressed pixel values may be less than or greater than half the capacity of the input pixel values.

Referring to FIG. 2A, the compressor 10 includes an input buffer 100, an output buffer 101, a first block encoder (normal encoder) 120, a second block encoder (random encoder) 130, and an error evaluation multiplexer (MUX) 140. The image value of a pixel of the display device 1 (refer to FIG. 1) may be provided to the input buffer 100, for example, based on a unit of an input pixel value that correspond to one pixel.

The input buffer 100 includes a storage area that sequentially stores input pixel values constituting one block based on a pointer that indicates a writing position. The input buffer 100 outputs input pixel values from the storage area to the encoder unit 11 based on a pointer that includes a reading position.

The time for the encoder unit 11 to compress input pixel values may be longer than the time for transferring input pixel values to the encoder unit 11 through the input buffer 100. If this is the case, a plurality of encoder units may be used to shorten the compression time. For example, the data may be processed in parallel. In one embodiment, the encoder unit 11 may process data in a time division manner using one circuit. Alternatively, the encoder unit 11 may process data in parallel using a plurality of circuits.

As previously indicated, each encoder unit 11 includes the normal encoder 120 and the random encoder 130. The normal encoder 120 processes block data which includes input pixel values with a first (e.g., high) association. The random encoder 130 processes data of a block which includes input pixel values with second (e.g., low) association.

In one embodiment, the normal encoder 120 and the random encoder 130 may operate in parallel and output compressed pixel values for one block. Also, an error between first de-compressed pixel values compressed and de-compressed through the normal encoder 120 and input pixel values provided to the normal encoder 120 is compared with an error between second de-compressed pixel values compressed and de-compressed through the random encoder 130 and input pixel values provided to the random encoder 130. Based on this comparison, compressed pixel values output from an encoder with a small error are output together with the error.

Figure 2B:
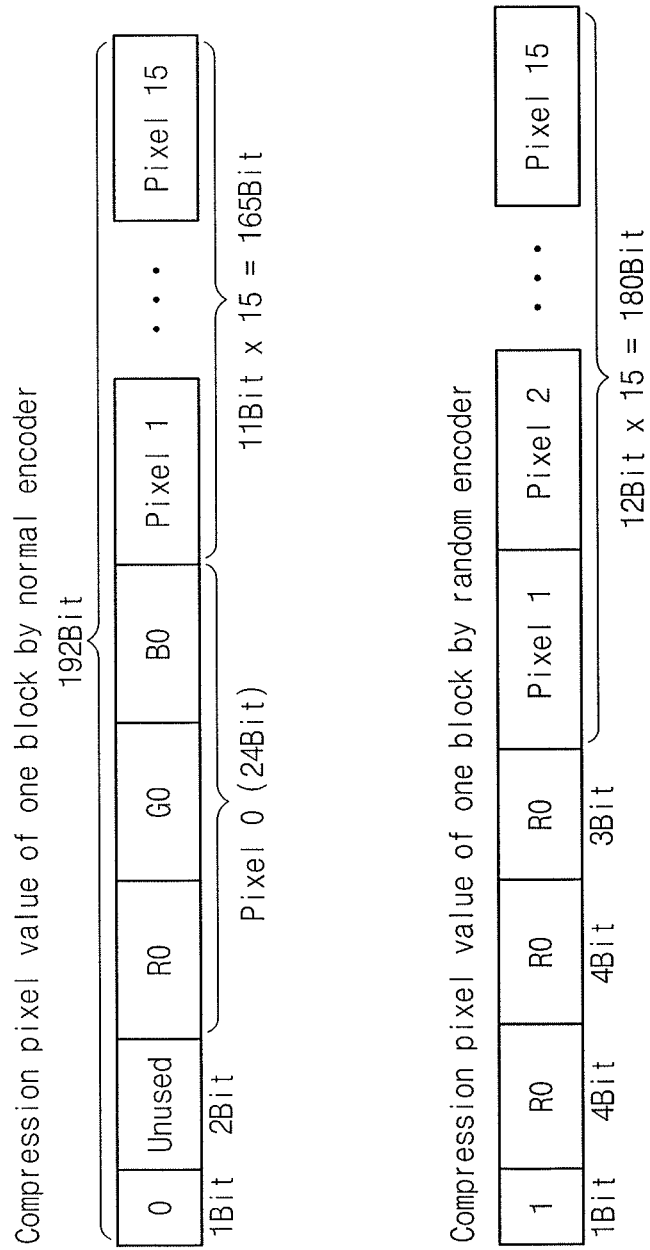
FIG. 2B illustrates an example of compression pixel values for a block.

FIG. 2B illustrates an example of compressed pixel values for one block. Referring to FIGS. 2A and 2B, different numbers of bits are allocated to components that include compressed pixel values of a block output from each encoder. However, the compression pixel values of one block may be expressed with 192 bits regardless of an encoder. Also, the compression ratio may be 50% because one block is expressed with 384 bits as described above.

Initially, a determination is made as to whether the compressed pixel values are compressed by the normal encoder 120 or the random encoder 130. This determination may be made, for example, based on the value of a first bit of the compressed pixel value. For example, a first bit having a 0 value may indicate that the compressed pixel value of one block was compressed by the normal encoder 120. A first bit having a 1 value may indicate that the compressed pixel value of one block was compressed by the random encoder 130.

A first compressed pixel value, corresponding, for example, to a head of one block, from among compressed pixel values of a block compressed by the normal encoder 120, may be expressed by a predetermined number of bits, e.g., 24 bits. For example, a first input pixel value corresponding to the head of the block may be output as a first compressed pixel value without compression. Thus, degradation of data is prevented by compressing other input pixel values according to the first input pixel value not compressed, which may reduce adverse effects caused by block noise. A second compressed pixel value, after the first compression pixel value, may be expressed with 11 bits.

The second input pixel value may be quantized using different modes. For example, the second input pixel value may be directly quantized through one mode. According to one embodiment, direct quantization may be understood to mean that the second input pixel value is quantized without referring to other pixel values.

Also, in other modes, the second input pixel value may be quantized referring to de-compressed pixel values of one or more other pixels. For example, when correlation among input pixel values corresponding to adjacent pixels is high, degradation of image quality is suppressed with a few bits by quantizing a difference between a corresponding input pixel value and a de-compressed pixel value of another pixel, i.e., differential quantization.

Compression pixel values of one block compressed by the random encoder 130 may be expressed by a predetermined number of bits (e.g., 12 bits) with respect to all pixel values. This is because, when correlation among input pixel values is low, it may be more effective to allocate the average number of bits to all compressed pixel values for suppressing degradation of image quality, than to allocate many bits to some compressed pixel values. Also, in this case, input pixel values may be compressed using a plurality of modes.

Compressed pixel values and errors of one block output from each of the normal and random encoders 120 and 130 are provided to the MUX 140. The MUX 140 compares the errors, and selects an output of one, providing the error is a small value, of the normal and random encoders 120 and 130 based on a result of the comparison. The selected output may be provided to the output buffer 101 as compressed pixel values. Compressed pixel values output to the output buffer 101 may, for example, be randomly selected and may not provided to correspond to 16 pixels like input pixel values.

An error may be calculated, for example, based on the following equation:

$$\sum_{i=0}^{15} (|R_i - R'_i| + |G_i - G'_i| + |B_i - B'_i|) \quad (1)$$

In the Equation 1, R, G, and B indicate red data, green data, and blue data of a previous input pixel value, and R', G', and B' indicate red data, green data, and blue data of a de-compressed pixel value generated after de-compressing the red data, green data, and blue data of an input pixel value.

Figure 3:
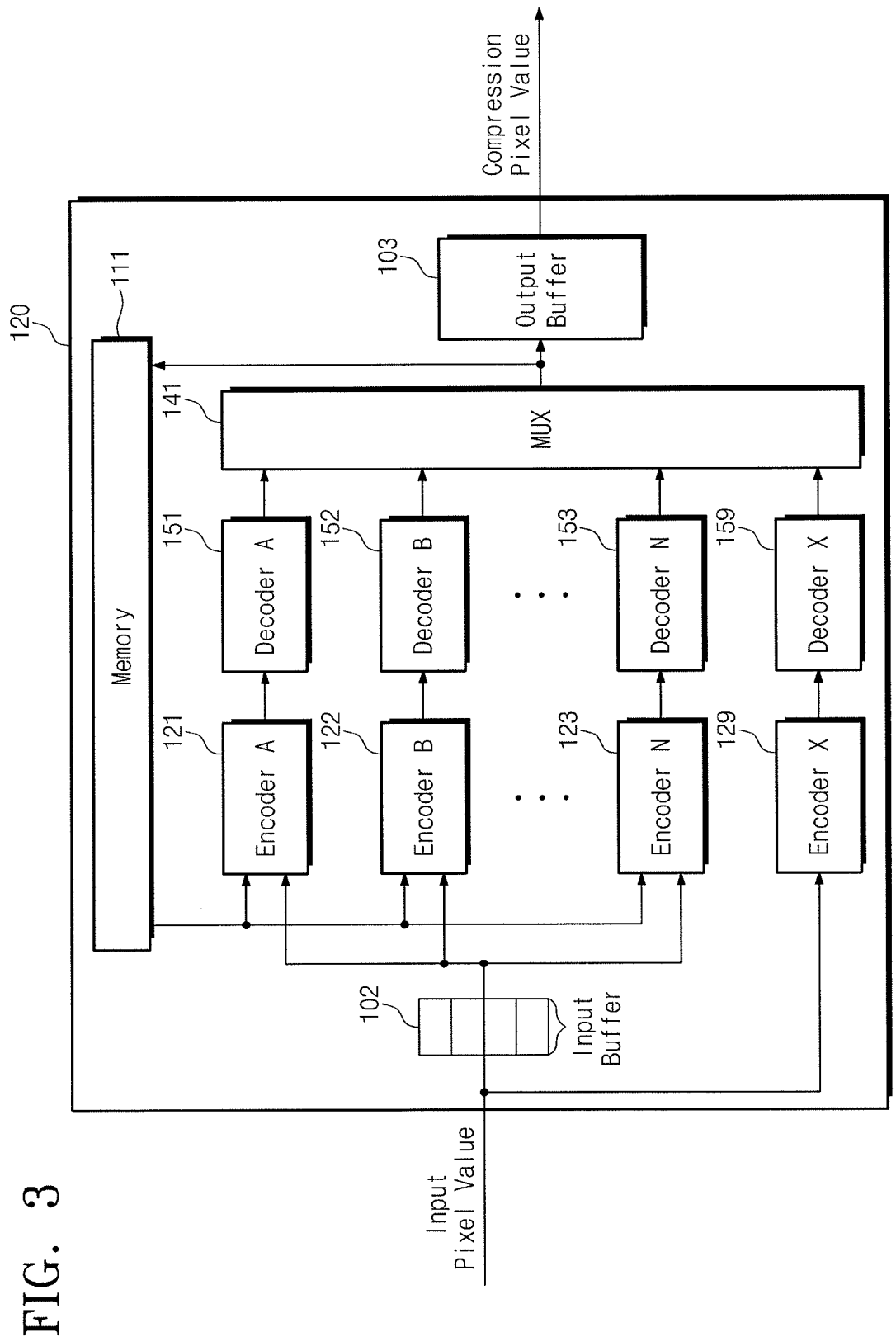
FIG. 3 illustrates an embodiment of a normal encoder.

FIG. 3 illustrates an embodiment of a normal encoder 120 which includes an input buffer 102, an output buffer 103, a memory 111, an encoder A to an encoder N 121 to 123, an encoder X 129, a decoder A to a decoder N 151 to 153, and a decoder X 159.

The encoder A to encoder N 121 to 123 compress input pixel values through an encode mode A to an encode mode N. The encoder X 129 compresses an input pixel value through an encode mode X. In one embodiment, input pixel values corresponding to one to four pixels are provided to each encoder.

The encoder X performs compression through encode mode X and outputs an input pixel value directly to the output buffer 101 without compressing the input pixel value. In other embodiments, the normal encoder 120 may not include encoder X. In this case, the normal encoder 120 may output a first input pixel value at a head of a block as a first compression pixel value.

The normal encoder 120 may express the first compressed pixel value provided at the head of the block using, for example, 24 bits. For example, the first input pixel value provided at the head of the block is supplied to the encoder X 129, and the encoder X 129 outputs the first input pixel value as the first compressed pixel value without modification. Thus, like the first input pixel value, the first compressed pixel value is expressed with 24 bits. In other embodiments, the first input pixel value may be directly output to the output buffer 103, and may not be provided to the encoder X.

Compressed pixel values other than the first input pixel value may be compressed into 11 bits (refer to FIG. 2B). For example, input pixel values other than the first input pixel value are encoded through the encoder A to the encoder N 121 to 123 such that they are compressed into 11-bit compression pixel values.

As described above, now that the first compression pixel value provided at the head of the block is expressed using 24 bits, it is possible to suppress influence due to block noise generated when the first compressed pixel value provided at the head of the block considerably gets out of the first input pixel value. In the present embodiment, the first pixel value is expressed by 24 bits. In other embodiments, the first pixel value may be expressed by another number of bits. Also, the first compressed pixel value may have more bits than the compressed pixel values following the first compressed pixel value.

The input buffer 102 sequentially stores input pixel values at a storage area in a unit of one to four input pixel values, and transmits them to each encoder. Input pixel values transmitted from the input buffer 102 are compressed in parallel by encoders. The number of input pixel values that each encoder receives and compress may vary with encoding mode. In one embodiment, each encoder may perform compression by a unit of one to four input pixel values. However, compression may be performed in a unit of a different number of input pixel values in an alternative embodiment. For example, each encoder may receive and compress more input pixel values.

A de-compressed pixel value of a reference pixel is stored in the memory 111. The de-compressed pixel value of the reference pixel may be a value obtained by de-compressing a compressed pixel value corresponding to the reference pixel. An encoder that performs encoding mode using the de-compressed pixel value of the reference pixel may use a de-compressed value of the reference pixel.

The MUX 141 is provided with errors calculated by comparing compressed pixel values from the encoder A to the encoder N 121 to 123, de-compressed pixel values generated by de-compressing the compressed pixel values through the decoder A to the decoder N 151 to 153, input pixel values, and de-compressed pixel values of the input pixel values. Afterwards, the MUX 141 selects an output of an encoder that provides a predetermined (e.g., smallest) error and outputs a selected compressed pixel value to the output buffer and a selected de-compressed pixel value to the memory 111. A compressed pixel value output to the output buffer 103 may not be limited to the number of pixels equal to an input pixel value and, for example, may be randomly set.

Errors of an encoding mode A to an encoding mode N may be calculated based on the following equation:

$$\max(|R_i - R'_i| + |G_i - G'_i| + |B_i - B'_i|) \quad (2)$$

In Equation 2, I indicates an index of 0 to N. The letters R, G, and B indicate red data, green data, and blue data of a previous input pixel value, and R', G', and B' indicate red data, green data, and blue data of a de-compressed pixel value after de-compressing red data, green data, and blue data of an input pixel value.

For example, referring to Equation 2, in an encoding mode where four input pixel values corresponding to four pixels are simultaneously encoded, errors of compressed pixel values from a first pixel (i=0) to a fourth pixel (i=3) are calculated, and a maximal error of the calculated errors is output.

Figure 4:
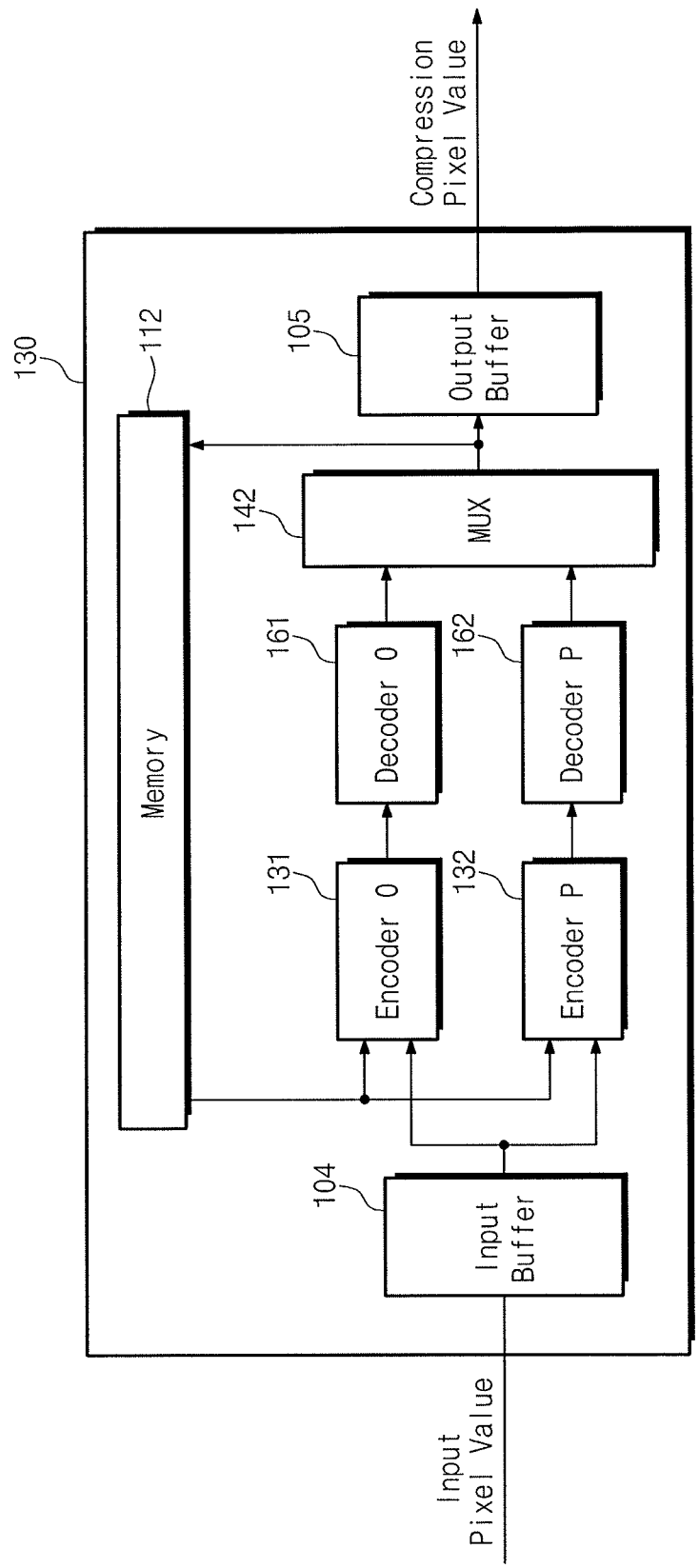
FIG. 4 illustrates an embodiment of a random encoder.

FIG. 4 illustrates an embodiment of a random encoder 130 which includes an encoder O and an encoder P 131 and 132 that perform compression using an encoding mode O and an encoding mode P. A compressed pixel value output from the random encoder 130 may be expressed by a predetermined number of bits, e.g., 12 bits. Input pixel values from the input buffer 104 are transmitted to the encoder O and the encoder P 131 and 132, so that data compression is performed in parallel through the encoders.

Because the random encoder 130 is used to process input pixel values with low correlation, unlike a normal encoder 120, each encoder receives and compresses one input pixel value, and does not process input pixel values at the same time.

The MUX 142 are provided with errors calculated by comparing compressed pixel values of respective encoders, de-compressed pixel values generated by de-compressing the compressed pixel values through the decoder O and the decoder P 161 and 162, input pixel values, and de-compressed pixel values of the input pixel values.

The MUX 142 selects the output of an encoder that provides a predetermined (e.g., smallest) error and outputs a selected compressed pixel value to the output buffer 105 and a selected de-compressed pixel value to the memory 112.

In one embodiment, each encoder receives and compresses input pixel values by a unit of one input pixel value. In another embodiment, each encoder receives two or more input pixel values and compresses them at the same time. Also, a compressed pixel value output to the output buffer 105 is not limited to the number of pixels equal to an input pixel value, and, for example, may be randomly set.

Figure 5:
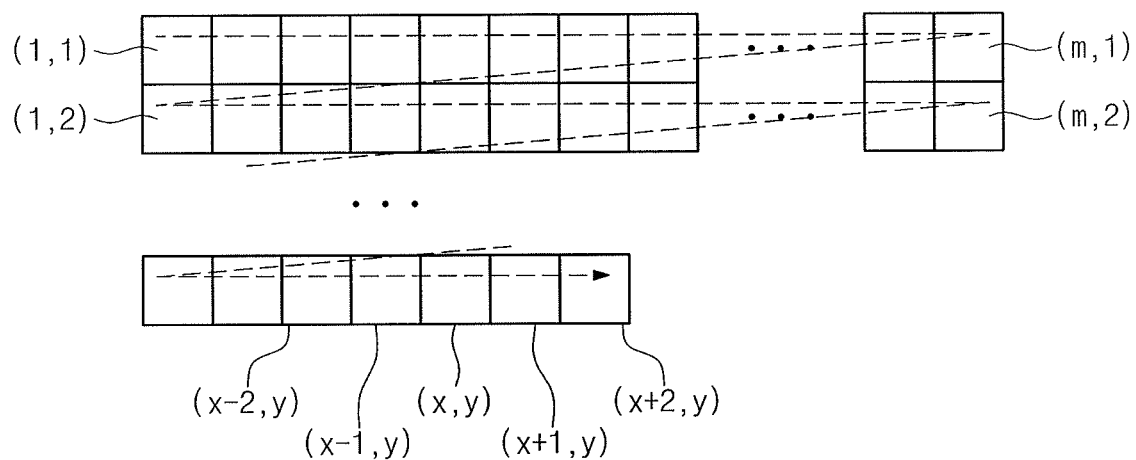
FIG. 5 illustrates an example of an input order of pixel values of image data.

FIG. 5 illustrates an example of an input order of pixel values of image data. Referring to FIG. 5, input pixel values are de-compressed in an order of input pixel values corresponding to pixels to be provided to the first column and the first row (1, 1) to the mth column and the first row (m, 1) and to the second column and the first row (1, 2) to the mth column and the second row (m, 2).

A target pixel corresponding to an input pixel value to be compressed and de-compressed is marked by (x, y). Input pixel values corresponding to (x−1, y) and (x−2, y) may be compressed and de-compressed prior to a point in time when an input pixel value corresponding to a target pixel is compressed and de-compressed.

This embodiment may be performed as input pixel values are sequentially received. In other embodiments, input pixel values may be received by a unit corresponding to n-by-n pixels. For example, when a processing unit corresponds to 16 pixels (n=4), input pixel values are received by a unit corresponding to 4-by-4 pixels.

FIGS. 6 to 16 illustrate different types of encoding for a compressed pixel value, compressed through an encoding mode A to an encoding mode N of a normal encoder 120. A compressed pixel value corresponding to each pixel may be formed of an identifier, a reference value, a pattern value, and/or at least one of values that are obtained by quantizing red data, green data, or blue data of an input pixel value.

Compression may be performed by a unit of one input pixel value corresponding to one pixel, or by a unit of a block including input pixel values corresponding to two or more pixels. A bit at the head of a block may be allocated to serve as an identifier, a reference value, and/or a pattern value. Subsequent bits may be allocated to express quantization values corresponding to one pixel or a plurality of pixels.

In one embodiment, the bit at the head of a block serves an identifier and a reference value, and subsequent bits express red data, green data, and blue data that are quantized. Whether or not a bit is to be used as an identifier, a reference value, or a quantization value may be different from embodiment to embodiment.

(1) Direct Mode Encoding

Figure 6:
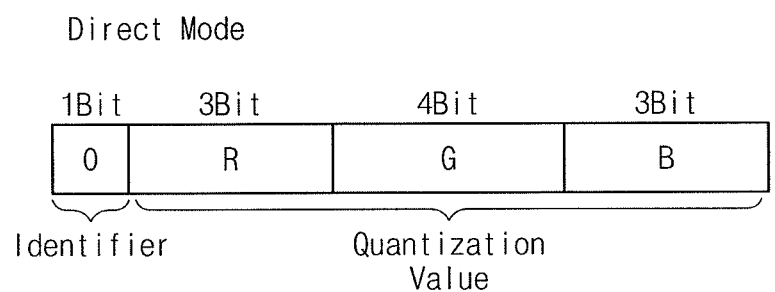
FIG. 6 illustrates an example of direct mode encoding by a normal encoder.

FIG. 6 illustrates an example of direct mode encoding by a normal encoder. Referring to FIG. 6, an original input pixel value is directly quantized in this mode. A compressed pixel value produced through direct mode encoding has an identifier and a quantization value.

The quantization value includes R data, G data, and B data, obtained by quantizing red data, green data, and blue data of an input pixel value. The identifier is expressed by one bit. The R data, G data, and B data are expressed with three bits, four bits, and three bits, respectively. In other embodiments, the G data may be expressed with three bits, and either one of R data and B data may be expressed with four bits.

Because a person's ability to perceive resolution on a variation in brightness increases in a resolution order on green color, red color, and blue color, G data for the green color may be expressed using more bits. Direct quantization on a normal encoder 120 (refer to FIG. 3) will be more fully described with reference to FIG. 22. Direct mode encoding may be used, for example, when a predetermined (e.g., low) correlation exists among adjacent pixels.

(2) Backward Reference Mode Encoding

Figure 7:
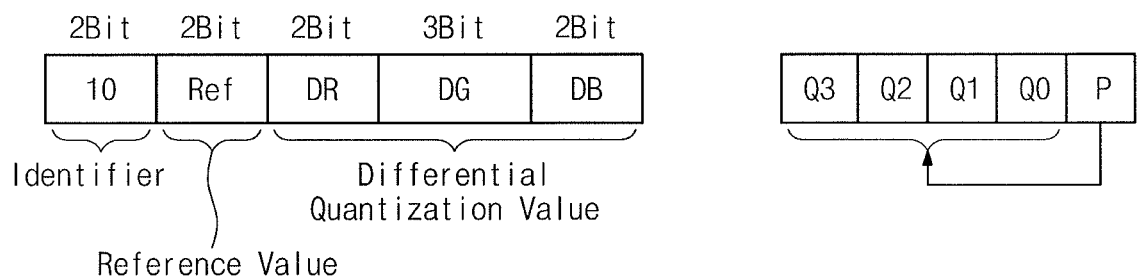
FIG. 7 illustrates an example of backward reference mode encoding by a normal encoder.

FIG. 7 illustrates an example of backward reference mode encoding by the normal decoder. Referring to FIG. 7, a compressed pixel produced through backward reference mode encoding may include an identifier, a reference value Ref, and a differential quantization value.

The identifier is expressed, for example, with the first two bits. The reference value Ref is expressed, for example, with two bits. The differential quantization value includes differential R data DR, differential G data DG, and differential B data DB expressed with two bits, three bits, and two bits, respectively. The differential R data DR, differential G data DG, and differential B data DB may be obtained through differential quantization. In other embodiments, a different number of bits may be used.

In this mode, differential values between de-compressed pixel values, corresponding to four pixels previously compressed, and an input pixel value corresponding to a target pixel P are respectively quantized.

For example, a differential value between a de-compressed pixel value stored in a memory 111 (refer to FIG. 3) and an input pixel value of a target pixel P may be quantized. Quantization may be performed for differential values produced based on remaining pixels Q1, Q2, and Q3.

Afterwards, errors between compressed pixel values corresponding to four pixels Q0 to Q3 and original input pixel values may be quantized, and a pixel corresponding to a de-compressed pixel value causing a predetermined (e.g., smallest) error is selected as a reference pixel.

A compressed pixel value and a de-compressed pixel value of the target pixel P and the selected reference pixel are output, and position information of the reference pixel is stored at an Ref field. Differential quantization using the reference pixel will be more fully described with reference to FIGS. 20A and 20B.

In accordance with at least one embodiment, a differential value may indicate the difference between an input pixel value of the target pixel P and a de-compressed pixel value of the reference pixel. The input pixel value is a pixel value of the target pixel P provided to an input buffer 102 (refer to FIG. 3). The de-compressed pixel value of the reference pixel may correspond to a value obtained by de-compressing a compressed pixel value of a reference pixel, previously compressed, through a decoder. This encoding mode may be used, for example, when correlation among adjacent pixels is high, or at least above a predetermined limit.

(3) Grey Mode Encoding

Figure 8:
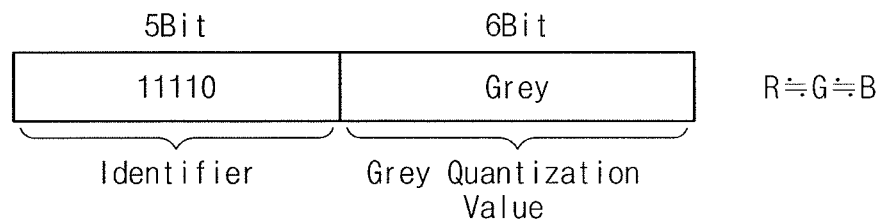
FIG. 8 illustrates an example of grey mode encoding by a normal encoder.

FIG. 8 illustrates an example of grey mode encoding by a normal decoder. This type of encoding may perform compression for display of a grey image.

Referring to FIG. 8, a compressed pixel value produced through grey mode encoding may include an identifier expressed by a predetermined number (e.g., first five) of bits and a grey quantization value Grey expressed by a predetermined number (e.g., six) of bits. For example, a grey quantization value Grey of "101100" may indicate that a quantization value of each of red data R, green data G, and blue data B is "101100." Direct quantization of a normal encoder 120 (refer to FIG. 3) will be more fully described with reference to FIG. 22. Grey mode encoding may be used for a grey image because values of red data R, green data G, and blue data B are similar to one another.

(4) Forward Reference Mode Encoding

Figure 9:
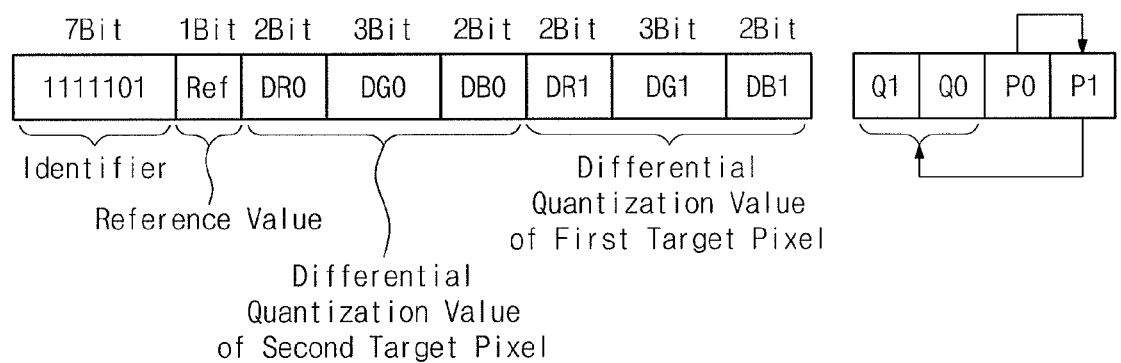
FIG. 9 illustrates an example of forward reference mode encoding by a normal encoder.

FIG. 9 illustrates an example of forward reference mode encoding by a normal decoder. Referring to FIG. 9, a compressed pixel value produced by forward reference mode encoding expresses data corresponding to a number (e.g., two) pixels with a predetermined number of bits, e.g., 22 bits.

A compressed pixel value contains an identifier, a reference value, a differential quantization value of a first target pixel, and a differential quantization value of a second target pixel. The identifier is expressed with a predetermined number (e.g., first seven) of bits. The reference value is expressed with a predetermined number (e.g., one) of bits. The differential quantization value of the first target pixel contains differential R data DR1, differential G data DG1, and differential B data DB1 expressed with predetermined numbers (e.g., two bits, three bits, and two bits, respectively) of bits. The data of the second target pixel includes differential R data DR0, differential G data DG0, and differential B data DB0 expressed with predetermined numbers of bits, e.g., two bits, three bits, and two bits respectively.

In this forward reference mode encoding, quantization is performed for a differential value between an input pixel value of the second target pixel P1 and de-compressed pixel values of two pixels Q0 and Q1 previously compressed, and for an input pixel value of the first target pixel P0 and a de-compressed pixel value of the second target pixel P1.

De-compressed pixel values of two pixels Q0 and Q1 previously compressed are obtained by de-compressing compressed pixel values of the two pixels Q0 and Q1, previously compressed, through a decoder. One decompressed pixel value is selected from among the de-compressed pixel values of the two pixels Q0 and Q1 previously compressed, as a reference pixel. The selected decompressed pixel value may one causing a predetermined (e.g., relatively small) error compared to an original input pixel value. Position information of a reference pixel is stored at a Ref field. A differential value may be quantized, for example, in the same manner as explained with reference to backward reference mode encoding.

With the above description, the first and second target pixels P0 and P1 may be integrated when compression is performed in the forward reference mode. Also, differential quantization with a reference pixel will be more fully described with reference to FIGS. 20A and 20B. Forward reference mode encoding may be used, for example, when there is a predetermined correlation (e.g., high) among adjacent pixels.

(5) Linear 2 Mode Encoding

Figure 10:
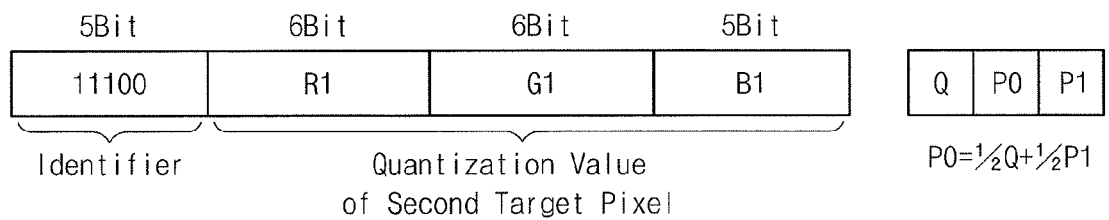
FIG. 10 illustrates an example of linear 2 mode encoding by a normal encoder.

FIG. 10 illustrates an example of linear 2 mode encoding by a normal decoder. Referring to FIG. 10, a compressed pixel value produced through a linear 2 mode encoding expresses data for a number (e.g., two) of pixels by a predetermined number of bits, e.g., 22 bits.

The compressed pixel value includes an identifier and a quantization value of a second target pixel. The identifier is expressed by a predetermined number (e.g., two) of bits. The quantization value of the second target pixel contains R data R1, G data G1, and B data B1 obtained by performing direct quantization for red data, green data, and blue data of an input pixel value. The R data R1, G data G1, and B data B1 are expressed by a predetermined numbers of bits, e.g., six bits, six bits, five bits respectively.

A de-compressed pixel value of a first target pixel P0 is determined to have an intermediate value between a de-compressed pixel value of a previously compressed reference pixel Q and a de-compressed pixel value of a second target pixel P1. Linear 2 mode encoding may be used, for example, when the hue of adjacent pixels varies with a constant or predetermined ratio.

(6) Pattern 2 Mode Encoding

Figure 11:
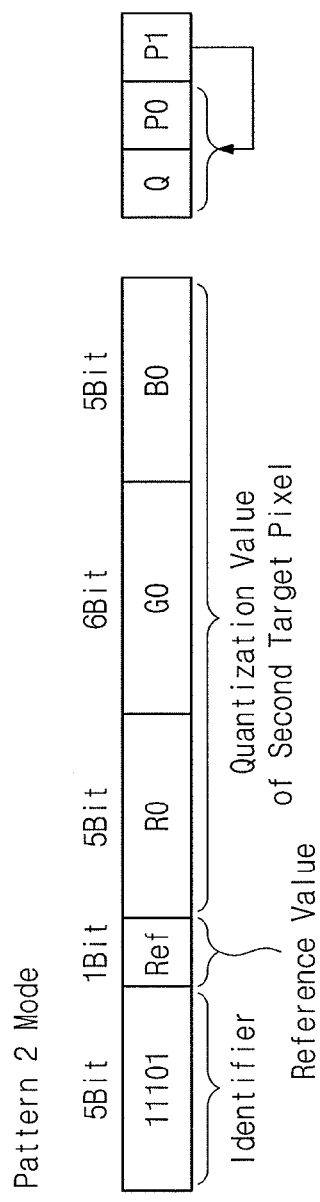
FIG. 11 illustrates an example of pattern 2 mode encoding by a normal encoder.

FIG. 11 illustrates an example of pattern 2 mode encoding by a normal decoder. Referring to FIG. 11, a compressed pixel value produced through a pattern 2 mode encoding expresses data for a number (e.g., two) of pixels by a predetermined number of bits, e.g., 22 bits.

The compressed pixel value includes an identifier, a reference value, and a quantization value of a second target pixel. The identifier is expressed by a predetermined number (e.g., first five) of bits. The reference value is expressed by a predetermined number (e.g., one) of bits. The quantization value of the second target pixel includes R data R0, G data G0, and B data B0 obtained by making direct quantization for red data, green data, and blue data of an input pixel value. The R data R0, G data G0, and B data B0 are expressed by predetermined numbers of bits (e.g., five bits, six bits, five bits respectively).

A de-compressed pixel value of the second target pixel P1 may have the same value as a de-compressed pixel value of a previous pixel Q previously compressed or a de-compressed pixel value of a first target pixel P0. One decompressed pixel value is selected from among de-compressed pixel values of the previous pixel Q and the first target pixel P0 as a reference pixel. The selected decompressed pixel value may be a predetermined value (e.g., one causing a relatively small error compared with an input pixel value of the second target pixel P1). Position information of the reference pixel is stored at a Ref field. Pattern 2 mode encoding may be used, for example, when one of adjacent pixels has the same pixel value.

(7) Pattern 3 Mode Encoding

Figure 12:
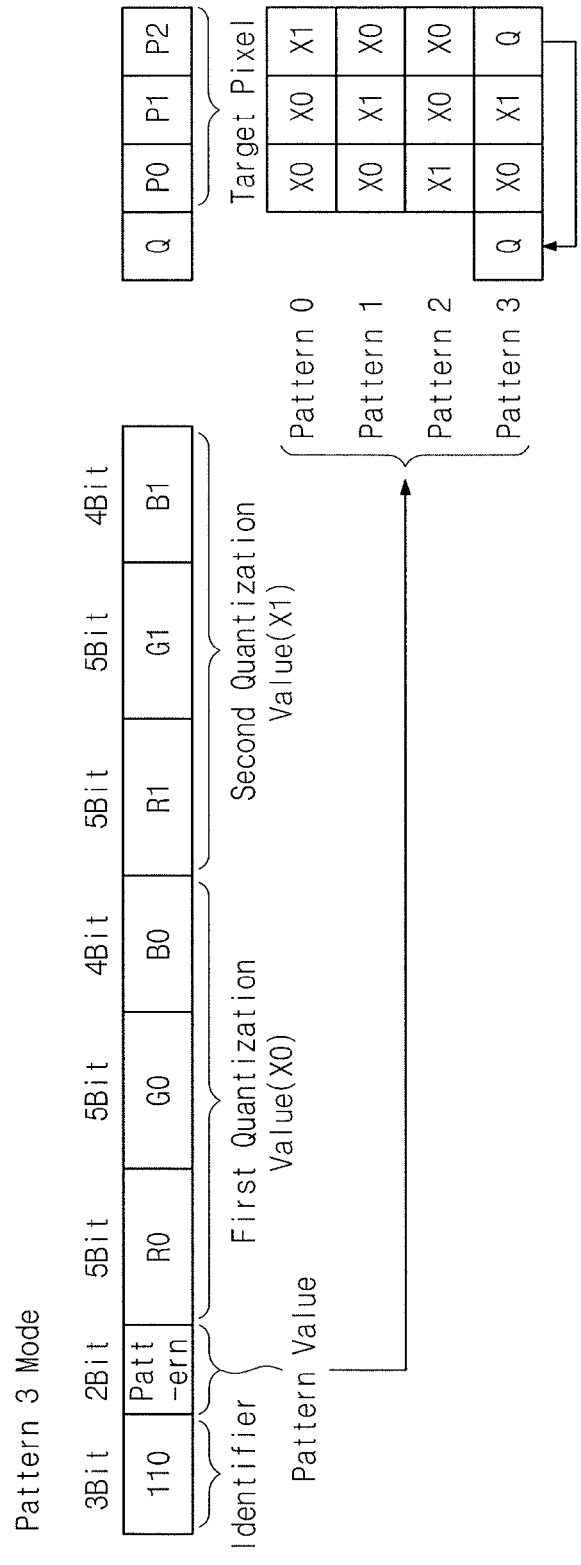
FIG. 12 illustrates an example of pattern 3 mode encoding by a normal encoder.

FIG. 12 illustrates an example of pattern 3 mode encoding by a normal decoder. Referring to FIG. 12, a compressed pixel value produced through a pattern 3 mode encoding expresses data corresponding to a number (e.g., three) pixels by a predetermined number of bits, e.g., 33 bits. In one embodiment, data corresponding to first to third pixels P0 to P2 may be compressed.

A compressed pixel value includes an identifier, a pattern value, a first quantization value X0, and a second quantization value X1. The first quantization value X0 is of first R data R0, first G data G0, and first B data B0. The second quantization value X1 is of second R data R1, second G data G1, and second B data B1.

The identifier is expressed with a predetermined number (e.g., three) of bits, and the pattern value is expressed with a predetermined number (e.g., two) of bits. The first R data R0, first G data G0, and first B data B0 are directly quantized, and may be obtained by quantizing red data, green data, and blue data of an input pixel value of one of first to third target pixels P0 to P2. The first R data R0, first G data G0, and first B data B0 are expressed with predetermined numbers (e.g., five bits, five bits, four bits, respectively) of bits.

The second R data R1, second G data G1, and second B data B1 are directly quantized, and may be obtained by quantizing red data, green data, and blue data of an input pixel value of another of the first to third target pixels P0 to P2. The second R data R1, second G data G1, and second B data B1 are expressed with predetermined numbers of bits, e.g., five bits, five bits, four bits respectively.

Data corresponding to each of the first to third target pixels P0 to P2 is expressed with patterns which are produced, for example, by combining the first quantization value X0 and the second quantization value X1. The patterns may include, for example, a pattern 0 to a pattern 3 that are different from one another. A quantization value corresponding to any pixel may be a value obtained by quantizing red data, green data, and blue data which constitute an input pixel value of a corresponding pixel.

The data of a reference pixel Q and the data of the first to third target pixels P0 to P2 may be related in the following manner. In the pattern 0, quantization values corresponding to the first and second target pixels P0 and P1 are the same as the first quantization value X0. A quantization value corresponding to the third target pixel P2 is the same as the second quantization value X1 (P0 =P1=X0, P 2 =X1).

In the pattern 1, quantization values corresponding to the first and third target pixels P0 and P2 are the same as the first quantization value X0. A quantization value corresponding to the second target pixel P1 is the same as the second quantization value X1 (P0=P2=X0, P1=X1).

In the pattern 2, a quantization value corresponding to the first target pixel P0 is the same as the second quantization value X1. Quantization values corresponding to the second and third target pixels P1 and P2 are the same as the first quantization value X0 (P0=X1, P1=P2=X0).

In the pattern 3, a quantization value corresponding to the first target pixel P0 is the same as the first quantization value X0, a quantization value corresponding to the second target pixel P1 is the same as the second quantization value X1, and a quantization value corresponding to the third target pixel P2 is the same as Q (P0=X0, P1=X1, P2=Q).

In one embodiment, four compressed pixel values are obtained by processing the pattern 0 to the pattern 3 in parallel or sequentially. Four de-compressed pixel values are produced by de-compressing the four compressed pixel values through a decoder. One de-compressed pixel value is selected from among the four de-compressed pixel values. The selected de-compressed pixel value may be a predetermined value, e.g., one having the smallest error compared with an original input pixel value.

Direct quantization of a normal encoder will be more fully described with reference to FIG. 22. Pattern 3 mode encoding may be used, for example, when adjacent pixels have a constant or predetermined pattern.

(8) Linear 4 Mode Encoding

Figure 13:
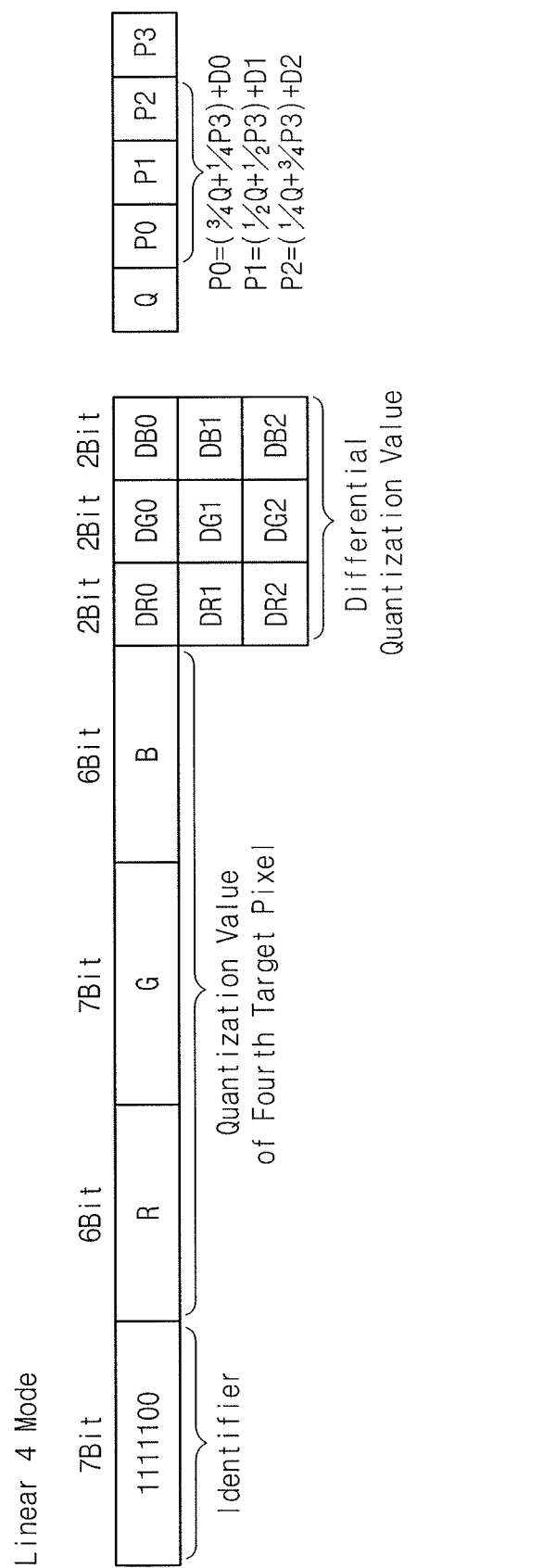
FIG. 13 illustrates an example of linear 4 mode encoding by a normal encoder.

FIG. 13 illustrates an example of linear 4 mode encoding by a normal decoder. Referring to FIG. 13, a compressed pixel value produced by linear 4 mode encoding expresses data corresponding to a number (e.g., four) pixels by a predetermined number of bits, e.g., 44 bits.

The compressed pixel value includes an identifier, a quantization value of a fourth target pixel, and a differential quantization value. The identifier is expressed with a predetermined number (e.g., first seven) of bits. The quantization value of the fourth target pixel includes R data R, G data G, and B data B obtained by performing direct quantization for red data, green data, and blue data of an input pixel value of the fourth target pixel P3. The R data R, G data G, and B data B are expressed with a predetermined numbers of bits, e.g., six bits, seven bits, and six bits respectively.

The differential quantization value includes first sub differential quantization values DR0 , DG0, and DB0 corresponding to a first target pixel P0, second sub differential quantization values DR1, DG1, and DB1 corresponding to a second target pixel P1, and third sub differential quantization values DR2, DG2, and DB2 corresponding to a third target pixel P2. A predetermined number of bits (e.g., two bits) are allocated to each of the sub differential quantization values (e.g., per color) to express each color.

A differential quantization value may be a value obtained by adding values, which are quantized by performing linear interpolation for first to third target pixels P0 to P2 based on a de-compressed pixel value of a reference pixel Q previously compressed and a de-compressed pixel value of a fourth target pixel P3, and first to third addition quantization values D0 to D2. The differential quantization value is expressed by a predetermined number of bits (e.g., 18 bits), with a number (e.g., two) bits allocated to each color.

For example, differential quantization values DR0, DG0, and DB0 corresponding to the first target pixel P0 may be determined by the following equation: $(¾Q+¼P3)±D0$, where Q indicates a de-compressed pixel value of a reference pixel, P3 indicates a de-compressed pixel value of a fourth target pixel, and D0 indicates a first addition quantization value.

The first to third addition quantization values D0 to D2 are obtained by quantizing a difference between a value, which is determined by linearly interpolating a de-compressed pixel value of the reference pixel Q and a de-compressed pixel value of the fourth target pixel P3, and input pixel values of first to third pixels P0 to P2. A differential quantization value may be calculated in the same way as described with reference to backward reference mode encoding. Direct quantization by a normal decoder will be more fully described with reference to FIG. 22. Linear 4 mode may be used, for example, when the hue of adjacent pixels varies with a constant or predetermined ratio.

(9) Reset Linear 4 Mode Encoding

Figure 14:
FIG. 14 illustrates an example of reset linear 4 mode encoding by a normal encoder.

FIG. 14 illustrates an example of reset linear 4 mode encoding by a normal decoder. Referring to FIG. 14, a compressed pixel value produced through reset linear 4 mode encoding expresses data corresponding to a number (e.g., four) of pixels by a predetermined number of bits, e.g., 44 bits.

The compressed pixel value includes an identifier, a pixel value of a first pixel, and differential quantization values DR3, DG3, and DB3. The identifier is expressed with a predetermined number of bits, e.g., first eight bits. The pixel value of the first pixel, for example, includes red data R, green data G, and blue data B of an input pixel value of a first target pixel P0. Each of the red data R, green data G, and blue data B is expressed with a predetermined number of bits, e.g., eight bits.

The differential quantization values DR3, DG3, and DB3 are obtained through differential quantization of a de-compressed pixel value of the first target pixel P0 and an input pixel value of a fourth target pixel P3. The differential quantization values DR3, DG3, and DB3 are expressed by a predetermined number of bits, e.g., nine bits. A predetermined number (e.g., 3) of bits are allocated to each color.

A value of each of second and third target pixels P1 and P2 is determined through linear interpolation between a de-compressed pixel value of the first target pixel P0 and a de-compressed pixel value of the fourth target pixel P3. A differential quantization value may be calculated in the same way as described with reference to backward reference mode encoding. The present encoding mode may be used, for example, when the hue of an adjacent pixel varies with a constant or predetermined ratio.

(10) Pattern 4 Mode Encoding

Figure 15:
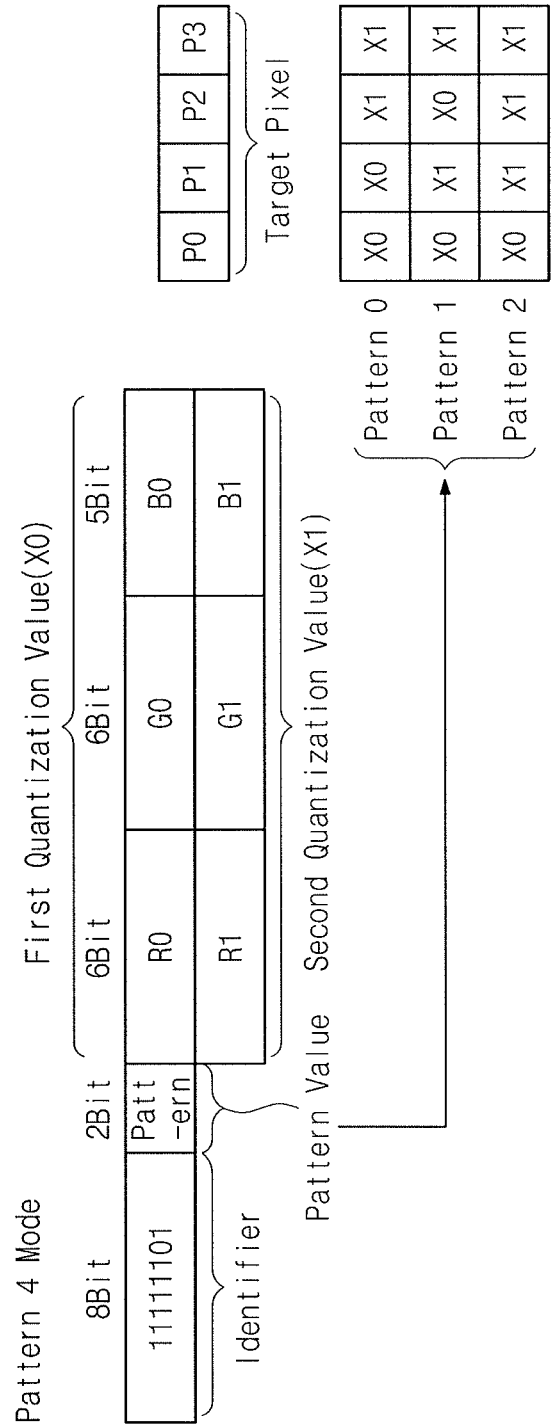
FIG. 15 illustrates an example of pattern 4 mode encoding by a normal encoder.

FIG. 15 illustrates an example of pattern 4 mode encoding by a normal decoder. Referring to FIG. 15, a compressed pixel value produced through pattern 4 mode encoding expresses data corresponding to a number (e.g., four) of pixels by a predetermined number of bits, e.g., 44 bits.

A compressed pixel value includes an identifier, a pattern value, a first quantization value X0, and a second quantization value X1. The first quantization value X0 includes first R data R0, first G data G0, and first B data B0. The second quantization value X1 includes second R data R1, second G data G1, and second B data B1. The identifier is expressed by a predetermined number (e.g., eight) of bits, and the pattern value is expressed by a predetermined number of bits, e.g., two bits.

The first R data R0, first G data G0, and first B data B0 are obtained by performing direct quantization for red data, green data, and blue data of an input pixel value of one of first to fourth target pixels P0 to P3, and are expressed by a predetermined number of bits, e.g., six bits, six bits, and five bits respectively.

The second R data R1, second G data G1, and second B data B1 are obtained by performing direct quantization with respect to red data, green data, and blue data of an input pixel value of one of first to fourth target pixels P0 to P3, and are expressed by a predetermined number of bits, e.g., six bits, six bits, and five bits respectively.

Data corresponding to each of the first to fourth target pixels P0 to P3 are expressed by patterns produced by combining the first quantization value X0 and the second quantization value X1. The patterns may include, for example, a pattern 0 to a pattern 2 that are different from one another. As described above, a quantization value corresponding to any pixel may be a value obtained by quantizing red data, green data, and blue data constituting an input pixel value of a corresponding pixel.

The first to fourth target pixels P0 to P3 may be related in the following manner. In the pattern 0, quantization values corresponding to the first and second target pixels P0 and P1 are the same as the first quantization value X0. Quantization values corresponding to the third and fourth target pixels P2 and P3 are the same as the second quantization value X1 (P0=P1=X0, P2=P3=X1).

In the pattern 1, quantization values corresponding to the first and third target pixels P0 and P2 are the same as the first quantization value X0. Quantization values corresponding to the second and fourth target pixels P1 and P3 are the same as the second quantization value X1 (P0=P2=X0, P1=P3=X1).

In the pattern 2, a quantization value corresponding to the first target pixel P0 is the same as the first quantization value X0. Quantization values corresponding to the second to fourth target pixels P1 to P3 are the same as the second quantization value X1 (P0=X0, P1=P2=P3=X1).

In one embodiment, three compressed pixel values are obtained by processing the pattern 0 to the pattern 2 in parallel or sequentially. Three de-compressed pixel values are produced by de-compressing the three compression pixel values through a decoder. One de-compressed pixel value is selected from among the three de-compression pixel values. The selected de-compressed pixel value may be a predetermined value, e.g., one having the smallest error compared with an original input pixel value. Direct quantization by a normal encoder will be more fully described with reference to FIG. 22. Pattern 4 mode encoding may be used, for example, when adjacent pixels have a constant or predetermined pattern.

(11) Terminal Mode Encoding

Figure 16:
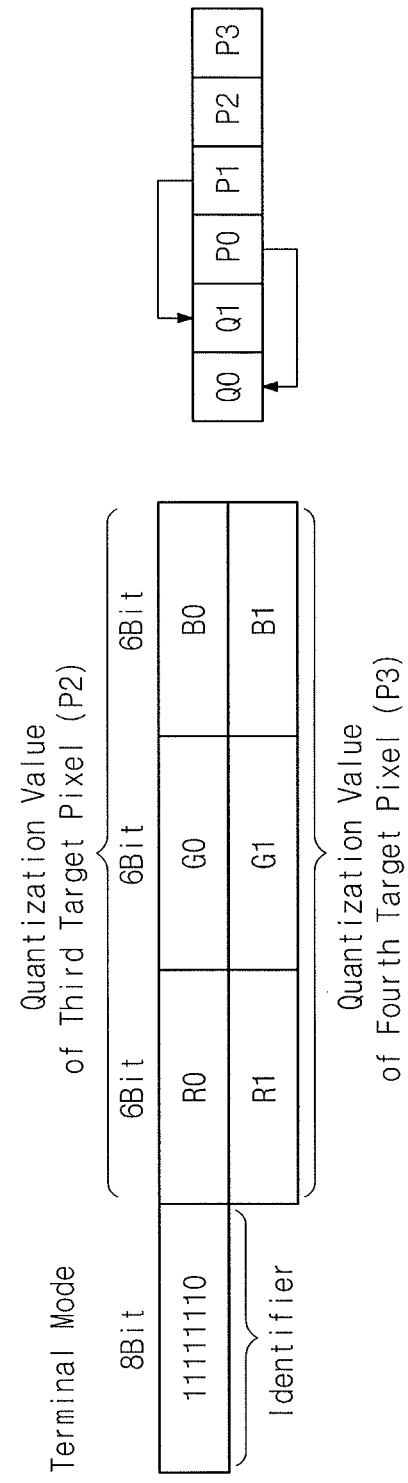
FIG. 16 illustrates an example of terminal mode encoding by a normal encoder.

FIG. 16 illustrates an example of terminal mode encoding by a normal decoder. Referring to FIG. 16, a compressed pixel value produced through terminal mode encoding expresses data corresponding to a number (e.g., four) of pixels by a predetermined number of bits, e.g., 44 bits.

A compressed pixel value contains an identifier, a quantization value of a third target pixel, and a quantization value of a fourth target pixel. The identifier is expressed by a predetermined number of bits, e.g., the first eight bits.

The quantization value of the third target pixel includes first R data R0, first G data G0. First B data B0 that are obtained by performing direction quantization for red data, green data, and blue data of an input pixel value of the third target pixel P2. The first R data R0, first G data G0, and first B data B0 are expressed by predetermined numbers of bits, e.g., six bits, six bits, and six bits respectively.

The quantization value of the fourth target pixel includes second R data R1, second G data G1 and second B data B1 obtained by performing direction quantization for red data, green data, and blue data of an input pixel value of the fourth target pixel P3. The second R data R1, second G data G1, and second B data B1 are expressed by predetermined numbers of bits, e.g., six bits, six bits, and six bits respectively.

De-compressed pixel values of first and second target pixels P0 and P2 may be the same as those of first and second reference pixels Q0 and Q2. Direction quantization by a normal encoder will be more fully described with reference to FIG. 22. The present encoding mode is used, for example, at switching from monochrome to another color.

Returning to FIG. 3, as described above, the above-described encode modes (1) to (11) are used as an encoding mode A to an encoding mode N corresponding to an encoder A to an encoder N 121 to 123 at compression.

The encoder A to the encoder N 121 to 123 operate in parallel and output one or more compressed pixel values obtained through compression, a de-compressed pixel value, and an input pixel value to decoder A to decoder N 151 to 153, respectively.

The decoder A to the decoder N 151 to 153 calculate errors by comparing de-compressed pixel values and input pixel values and output a compressed pixel value, a de-compressed pixel value, and an error to MUX 141.

The MUX 141 selects an encoder, outputting a de-compressed pixel value with a predetermined (e.g., the smallest) error, from the compressed pixel values and the de-compressed pixel values, and sends a compressed pixel value and a de-compressed pixel value from the selected encoder to an output buffer 103 and a memory 111, respectively.

In a mode where input pixel values corresponding to pixels are simultaneously compressed, an error corresponding to each pixel is calculated and a predetermined (e.g., maximum) value of the errors becomes an error value of such a mode. Herein, a quantization value output is not limited to the number of pixels equal to an input, and, for example, may randomly set.

Figure 17:
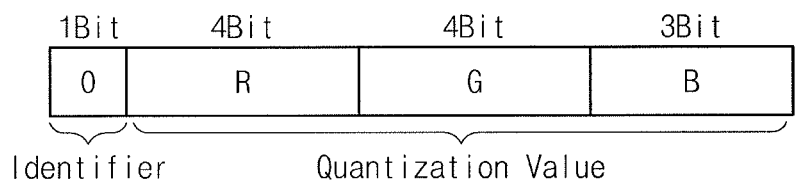
FIG. 17 illustrates an example of direct mode encoding of a random encoder by a normal encoder.
Figure 18:
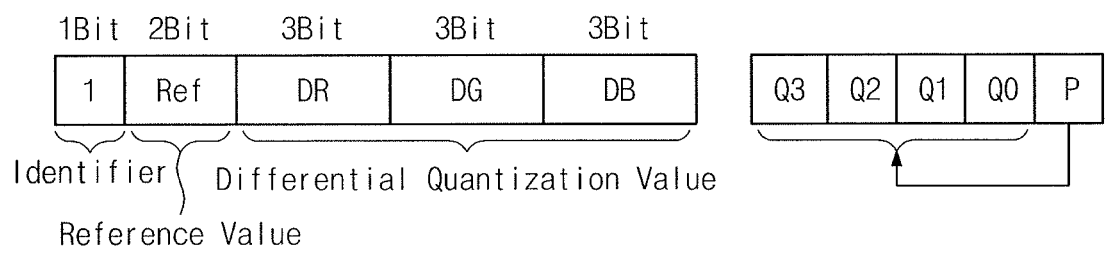
FIG. 18 illustrates an example of backward reference mode encoding of a random encoder.

FIG. 17 illustrates an embodiment of direct mode encoding by a random encoder. FIG. 18 illustrates an example of backward reference mode encoding by the random encoder.

Referring to FIGS. 17 and 18, a compressed pixel value of a pixel is expressed by a predetermined number of bits, e.g., 12 bits. The compressed pixel value includes an identifier and a reference value and R data, G data, and B data obtained by quantizing red data, green data, and blue data of an input pixel value.

In one embodiment, a bit at the head of a block is allocated to express the identifier, and subsequent bits are allocated to express R data, G data, and B data. The allocation of bits to express R data, G data, and B data may be changed in other embodiments.

In one embodiment, a compressed pixel value is expressed by a predetermined number of bits, e.g., 12 bits. In other embodiments, a compressed pixel value may be expressed by less or more than 12 bits. Quantization of an encoder will be more fully described with reference to FIGS. 17 and 18.

(12) Direct Mode Encoding

FIG. 17 illustrates an example of a compressed pixel value that is compressed by direct mode encoding by a random encoder. In direct mode encoding, red data, green data, and blue data of an original input pixel value are directly quantized, respectively.

A compressed pixel value produced by direct mode encoding has an identifier and a quantization value. The quantization value includes R data, G data, and B data obtained by quantizing red data, green data, and blue data of an input pixel value, respectively. The identifier is expressed by a predetermined number of bits, e.g., one bit. R data, G data, and B data are expressed by predetermined numbers of bits, e.g., four bits, four bits, and three bits, respectively. Alternatively, one of the R data or G data may be expressed by three bits, and the B data may be expressed by four bits.

Because a person's ability to perceive resolution based on a variation in brightness increases in a resolution order of green color, red color, and blue color, the G data for the green color may be expressed using more bits. In direct mode encoding by the random encoder, a predetermined number (e.g., 12) of bits are allocated to express a compressed pixel value. Thus, the reproducibility of a de-compressed pixel value is improved compared to direct mode encoding by a normal encoder. Direct quantization by a random encoder may be performed, for example, using the quantization tables in FIGS. 19A and 19B.

(12) Backward Reference Mode Encoding

FIG. 18 illustrates an example of a compressed pixel value compressed by backward reference mode encoding by a random encoder. The compressed pixel value includes an identifier, a reference value Ref, and a differential quantization value.

The identifier is expressed by a predetermined number of bits, e.g., the first bit. The reference value Ref is expressed by a predetermined number of bits, e.g., two bits. The differential quantization value includes differential R data DR, differential G data DG, and differential B data DB, each of which is expressed by a predetermined number of bits, e.g., three bits. The differential R data DR, differential G data DG, and differential B data DB may be obtained through differential quantization.

In the present encoding mode, a differential quantization value is obtained by quantizing a differential value between one of de-compressed pixel values of four pixels Q0 to Q3 previously compressed or an input pixel value of a target pixel P.

In one implementation, de-compressed pixel values are generated by de-compressing compressed pixel values of four pixels Q0 to Q3 through a decoder. A de-compressed pixel value is selected from among the four pixels Q0 to Q3 as a reference pixel. The de-compressed pixel value is a predetermined value, e.g., one with the smallest error. That is, an error between a de-compressed pixel value of a reference pixel and an original input pixel value of the reference pixel is smaller than errors between de-compressed pixel values of other pixels of the four pixels Q0 to Q4 and their input pixel values.

De-compressed pixel values of the four pixels Q0 to Q3 are stored in a memory 112 (refer to FIG. 4). Differential values between the de-compressed pixel values of the four pixels Q0 to Q3, stored in the memory 112, and an input pixel value of a target pixel P are quantized.

As an example, there are output a compressed pixel value of a differential value between an input pixel value of a target pixel P and a de-compressed pixel value of a selected reference pixel of the four pixels Q0 and Q3 and a de-compressed pixel value.

Position information of a reference pixel is stored at a Ref field. Differential quantization with a reference pixel will be more fully described with reference to FIGS. 21A and 21B. Because a compressed pixel value corresponding to one pixel is expressed by a predetermined number of bits (e.g., 12 bits) in backward reference mode encoding performed by a random encoder, the reproducibility of a de-compressed pixel value is improved compared with a backward reference mode perform by a normal encoder.

As described above, encoding modes (12) and (13) may be used as an encode mode O and an encode mode P corresponding to an encoder O and an encoder P of a random encoder 130 at compression. The encode modes may operate in parallel. One or more compressed pixel values obtained through compression, a de-compressed pixel value, and an error between an input pixel value and a de-compressed pixel value are output to MUX 142.

The MUX 142 selects an output of an encoder from among encoders and sends a selected compressed pixel value and a selected de-compressed pixel value to an output buffer 105 and a memory 112, respectively. The selected output of the encoder may be a predetermined output, e.g., one providing the smallest error. In one embodiment, image data of a pixel at the head of one block may be processed in direct mode.

As described above, compressed pixel values and errors of a block obtained from each of normal and random encoders are provided to MUX 140 (refer to FIG. 2A). The MUX 140 selects an output of an encoder (e.g., one providing the smallest error) from among outputs of encoders and provides the selected output to an output buffer 101.

As described above, an input pixel value is processed in parallel by a plurality of encode methods. A plurality of compressed pixel values are output in parallel together with an error. An error between an input pixel value and a compressed pixel value is provided to the MUX 140. The MUX 140 provides a frame memory 20 with a compressed pixel value with the smallest error as an output corresponding to one block.

Quantization Table

In accordance with one embodiment, direct quantization and differential quantization by a random encoder may be performed using quantization tables, for example, as shown in FIGS. 19 to 21. When an input range value not illustrated in FIGS. 19 to 21 is quantized, the value may be quantized, for example, through a shift operation shown in FIG. 22 without using quantization tables.

FIGS. 19A and 19B show quantization tables used when direct quantization is performed by a random encoder 130 (refer to FIG. 4). Referring to FIGS. 19A and 19B, a compressed pixel value produced in direct mode encoding by the random encoder 130 (described with reference to FIG. 17) includes R data and G data, expressed by 4-bit quantization (quantization step size=17), and B data expressed by 3-bit quantization (quantization step size=36).

For example, if R data of an input pixel value is 95, the quantization value quantized by an encoder may be 6 and a de-compressed value de-compressed by a decoder may be 102. Meanwhile, if B data of an input pixel value is 95, a quantization value may be 3 and a de-compressed value may be 108.

FIGS. 20A and 20B show quantization tables used when differential quantization is performed by a normal encoder. Referring to FIGS. 20A and 20B, a table for 2-bit quantization is different from a table for 3-bit quantization. Also, input ranges in tables of differential quantization shown in FIGS. 20A and 20B are irregularly partitioned. In other words, an input range is finely partitioned such that a small differential value is distinguishable. The reason is that differential quantization is performed under the assumption that a differential value has a small value, because pixel values used as a reference of a differential value are similar to one another.

FIGS. 21A and 21B show quantization tables used when differential quantization is performed by a normal encoder. As illustrated in FIGS. 21A and 21B, like FIGS. 20A and 20B, a table for 2-bit quantization is different from a table for 3-bit quantization. Also, an input range of a quantization table of a random encoder is wider than that of a normal encoder. This is because differential quantization of the random encoder is performed under the assumption that a differential value has a great value, as compared with differential quantization of a normal encoder. This is because a difference among pixel values used as a reference of a differential value is great.

As described above, in differential quantization tables of the normal and random encoders, a quantization value is produced under the condition that a small difference is finely approximated and under the condition that a great difference is roughly approximated. In a display image, if the degree of accuracy on approximation is rough at a portion where the variation in a pixel value (e.g., gradation) is small, a difference before and after compression may be easily seen. Quantization may be performed under the condition that fine approximation is performed at a portion where the variation in pixel value is small. Meanwhile, if the degree of accuracy on approximation is rough at a portion where the variation in pixel value is significant or large, a difference before and after compression may not be easily seen. Thus, it is possible to use an input range that is wide.

When an image is actually displayed, areas where variation in pixel value is different can be sequentially disposed. In this case, a large variation in pixel value is roughly approximated and a small variation in pixel value is finely approximated. Thus, reproducibility is improved at compression.

For example, a differential value is 1 when an input pixel value of a target pixel is 91 and a de-compressed pixel value of a reference pixel is 90. Referring to FIG. 20A, a quantization value is 0 when a normal encoder makes 2-bit quantization with respect to the differential value, and a de-compressed value is 0 when de-compression is performed by a decoder. A de-compressed pixel value of 90 is obtained through integration with a de-compressed pixel value of a reference pixel.

Referring to FIG. 20B, a quantization value is 1 when a normal encoder makes 3-bit quantization with respect to the differential value, and a de-compressed value is 1 when de-compression is performed by a decoder. A de-compressed pixel value of 91 is obtained through integration with a de-compressed pixel value of a reference pixel.

Referring to FIG. 21A, a quantization value is 0 when a random encoder performs 2-bit quantization with respect to the differential value, and a de-compressed value is 0 when de-compression is performed by a decoder. A de-compressed pixel value of 90 is obtained through integration with a de-compressed pixel value of a reference pixel.

Referring to FIG. 21B, a quantization value is 0 when a normal encoder makes 3-bit quantization with respect to the differential value, and a de-compressed value is 0 when de-compression is performed by a decoder. A de-compressed pixel value of 90 is obtained through integration with a de-compressed pixel value of a reference pixel. That is, the normal encoder may exactly reproduce a small gradation difference. Meanwhile, the random encoder may exactly express a relatively large gradation difference.

Shift Operation

FIG. 22 illustrates an embodiment of a shift method. Also, a quantization performed when an example is not included in FIGS. 19 to 21 at direct quantization and differential quantization will be explained.

In FIG. 22, "v" indicates an input value, "q" indicates a quantization value obtained by calculating the input value v, "b" indicates the number of bits after quantization, and "w" indicates a de-compressed value obtained by de-compressing the quantization value q.

In a quantization calculation equation 60 such as shown in FIG. 22, if an input value v is quantized with the number of bits b, lower bits may be ignored as many as a difference (8−b) between the number of original bits of each pixel value and the number of bits after quantization. Remaining upper bits may be used as a quantization value. For example, in case a 8-bit input value v of "11001010" is quantized into 5 bits, five upper bits other than three lower bits (8−5) are used as a quantization value. That is, the quantization value is "11001".

Next, a de-compression calculation equation 70 such as shown in FIG. 22 will be described. Here, de-compression may be performed by a decoder according to one of the aforementioned embodiments. With equations at a first row and a second row, "0" is added at de-compression in case all bits de-compressed are "0". With equations at a third row and a fourth row, "1" is added at de-compression in case all bits de-compressed are "1". In this embodiment, now that 8-bit de-compression is performed, a de-compression value is 255.

Referring to equations at fifth and sixth rows, a bit corresponding to a center value is added to suppress an error before and after calculation other than the above-described cases. The three examples above described will now be described for a specific non-limiting example.

In the case where de-compression is performed from five bits to eight bits, a value of "00000000" is obtained by de-compressing a value of "00000" and a value of "11111111" is obtained by de-compressing a value of "11111" (three bits from the rear are added bits). Also, a value of "11001100" is obtained by de-compressing a value of "11001" (three bits from the rear are added bits).

Figure 23:
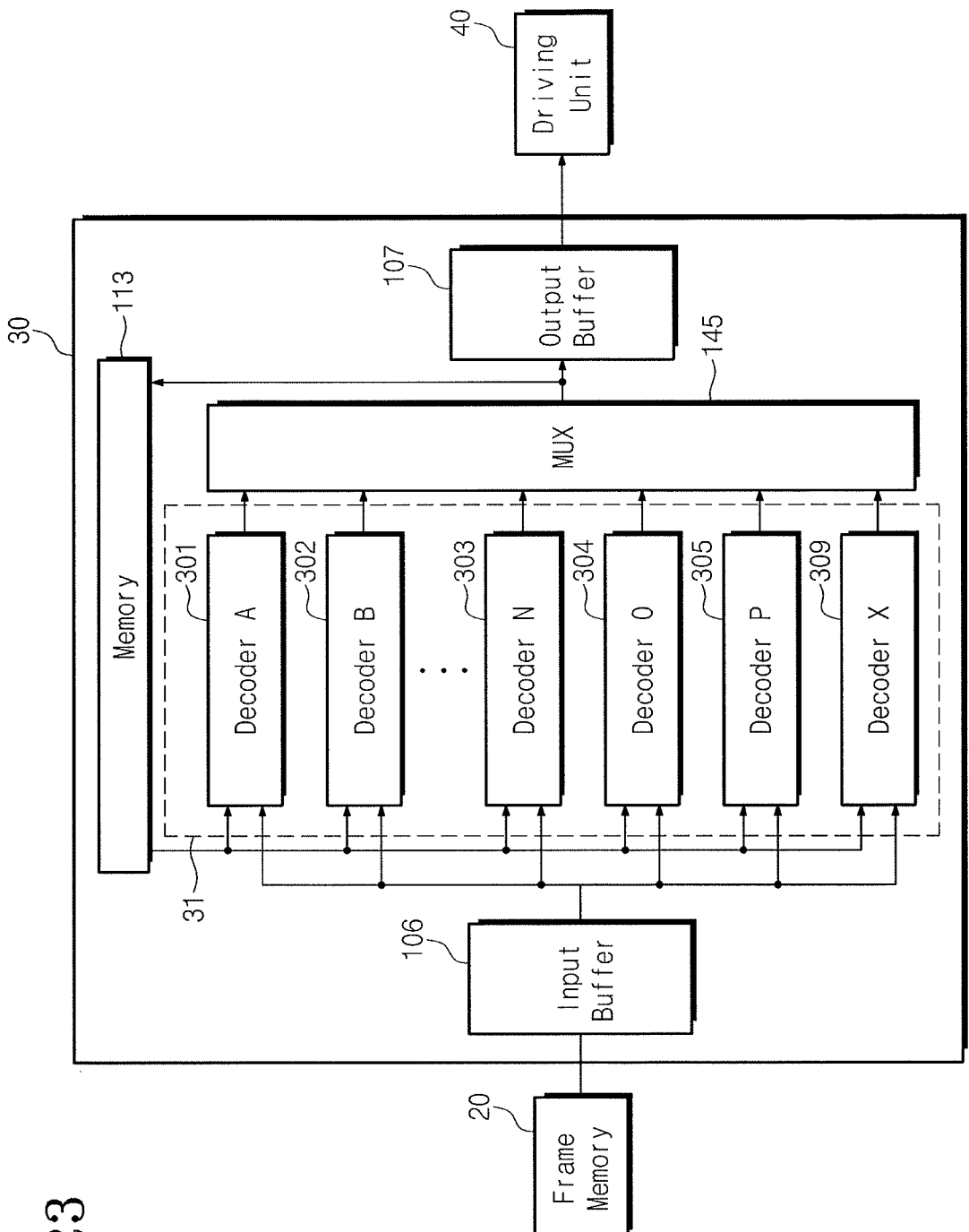
FIG. 23 illustrates an embodiment of a de-compressor.

FIG. 23 illustrates an embodiment of a de-compressor 30 which includes a plurality of decoder units 31. The decoder unit 31 includes a plurality of decoders that correspond to encoders of the encoder unit 11. In one embodiment, a decoder A, a decoder B, and a decoder X correspond to an encoder A, an encoder B, and an encoder X, respectively.

First, an output of the frame memory 20 is provided to the input buffer 106. The input buffer 106 sequentially stores a compression pixel value from the frame memory 20 at a storage area based on a pointer indicating a writing position, and transmits a compressed pixel value from the storage area to the decoder unit 31 based on a pointer indicating a reading position.

Unlike the encoder unit 11, the decoder unit 31 is configured such that all decoders are connected in parallel between the input buffer 106 and MUX 145. For example, a compressed pixel value of the frame memory 20 is supplied in parallel to decoders. Each decoder outputs a flag, indicating whether a de-compression pixel value de-compressed and an identifier are correct, according to an identifier in the compressed pixel value. The MUX 145 selects a correct de-compressed pixel value from the output flag and outputs it to an output buffer 107.

Here, if a compressed pixel value includes a differential quantization value, a de-compressed pixel value, produced by adding a differential quantization value to a de-compressed pixel value of a reference pixel read from the memory 113, may be output to the MUX 145. Also, processing is independently performed by selecting a decoder in response to an identifier of a pixel value provided to the input buffer 106. In this case, because only a necessary decoder operates, it is possible to achieve low power consumption.

In one embodiment, one pixel is divided into sub-pixels corresponding to three colors R, G, and B. In other embodiments, a device may display monochrome gray scale values. In this case, because the above-described sub-pixel acts as one pixel, accuracy is improved as much as three times, thereby making possible to implement a more accurate display device.

In a display device 1 according to another, an input pixel value is compressed using the above-described compressor 10. Thus, an input pixel value is compressed to thereby suppress influence of block noise. In other words, the capacity of the frame memory 20 is reduced and lowering of the display quality of an image displayed on a display panel 50 is suppressed.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

By way of summation and review, various approaches have been developed in an attempts to reduce the cost of operating a display panel. One approach involves reducing the capacity of the frame memory. However, this approach limits resolution.

Another approach involves reusing a portion of the frame memory. This may be accomplished by dividing an image into blocks of a predetermined length, and then performing compression and de-compression on the block. However, block noise may be introduced which may have an adverse effect on display quality.

For example, according to the latter approach, when image data is compressed or de-compressed on a block basis, an image may easily be degraded. For example, block noise may occur when a leading pixel value of a block gets out of original data at compressing and de-compressing. One problem with block noise is that it causes boundaries between blocks to be seen.

In accordance with one or more of the aforementioned embodiments, an image coding device is provided which includes a first block encoder to compress a plurality of input pixel values having a first and second input pixel values by a unit of a block. The first input pixel value may be provided at the head of the block, and the second input pixel value following the first input pixel value may be provided within the block.

The first block encoder 120 may include a second encoder to compress the first input pixel value to a first compressed pixel value; and a first encoder to compress the second input pixel value into a second compressed pixel value. The number of bits of the second compressed pixel value is less than the number of bits of the first compressed pixel value. Therefore, it is possible to suppress influence due to block noise generated when the first compressed pixel value at the head of the block considerably gets out of the first input pixel value.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. An image coding device, comprising:
a first block encoder to compress a plurality of input pixel values including first and second input pixel values in a unit of a block, the first input pixel value provided at a head of the block and the second input pixel value following the first input pixel value within the block, wherein the first block encoder includes a first encoder to output the first input pixel value as a first compressed pixel value and to compress the second input pixel value to a second compressed pixel value, and wherein the second compressed pixel value has fewer bits than the first input pixel value.

2. An image coding device, comprising:
a first block encoder to compress a plurality of input pixel values including first and second input pixel values in a unit of a block, the first input pixel value provided at a head of the block and the second input pixel value following the first input pixel value within the block, wherein the first block encoder includes a second encoder adapted to compress the first input pixel value to a first compressed pixel value, wherein a first encoder is to compress the second input pixel value to a second compressed pixel value, and the second compression pixel value has fewer bits than the first compressed pixel value.

3. The device as claimed in claim 2, wherein the first encoder is to quantize a difference between the second input pixel value and a reference pixel value.

4. The device as claimed in claim 3, wherein the reference pixel value includes a de-compressed pixel value obtained by de-compressing the first compressed pixel value.

5. The device as claimed in claim 2, wherein the first encoder is to directly quantize the second input pixel value.

6. The device as claimed in claim 2, further comprising:
a second block encoder to compress the input pixel values by the unit of the block in a manner different from the first block encoder; and
a first multiplexer to compare an error between a first de-compressed pixel value and the input pixel values with an error between a second de-compressed pixel value and the input pixel values, the first multiplexer to select and output a compressed pixel value from one of the first or second block encoders that provides a predetermined error, wherein the first de-compressed pixel value is compressed and de-compressed through the first block encoder, and wherein the second de-compressed pixel value is compressed and de-compressed through the second block encoder.

7. The device as claimed in claim 2, wherein the first block encoder includes:
a plurality of first encoders to compress the second input pixel value in different ways, and to output the compressed results as second compressed pixel values; and
a second multiplexer to calculate errors between second de-compressed pixel values and the second input pixel values, to compare the errors, and to select and output a second compressed pixel value output from one of the first encoders providing a predetermined error, wherein the de-compressed pixel values are to be generated by de-compressing the second compressed pixel values.

8. The device as claimed in claim 3, wherein:
the input pixel values include a third input pixel value, and the second block encoder includes:
a plurality of third encoders to compress the third input pixel value in different ways, and to output the compressed results as third compression pixel values, a third multiplexer to calculate errors between third de-compressed pixel values and the third input pixel values, to compare the errors, and to select and output a third compressed pixel value output from one of the third encoders providing a predetermined error,
third de-compressed pixel values are generated by de-compressing the third compression pixel values from the third encoders.

9. A method for coding a plurality of input pixel values in a unit of a block, the method comprising:
outputting a first input pixel value as a first compressed pixel value; and
compressing a second input pixel value to a second compressed pixel value, wherein second compressed pixel value has fewer bits than the first compressed pixel value and wherein the first input pixel value is at a head of the block and the second input pixel value follows the first input pixel value within the block.

10. A method for coding a plurality of input pixel values in a unit of a block, the method comprising:
compressing a first input pixel value to a first compressed pixel value; and
compressing a second input pixel value to a second compressed pixel value,
wherein the first input pixel value is provided ahead of the second input pixel value in the block and wherein the second compressed pixel value has fewer bits than the first compressed pixel value.

11. An image coding device, comprising:
a first block encoder to compress input pixel values including first and second input pixel values in a block, the first input pixel value at a first position of the block and the second input pixel value at a second position of the block; and
a second block encoder to compress the input pixel values by the unit block, wherein the first and second block encoders are to compare the input pixel values based on different methods of compression, and wherein the first block encoder is to output the first input pixel value as a first compressed pixel value and to compress the second input pixel value to a second compressed pixel value.

12. The device as claimed in claim 11, wherein the second compressed pixel value has fewer bits than the first input pixel value.

13. The device as claimed in claim 11, further comprising:
a first multiplexer to compare an error between a first de-compressed pixel value and the input pixel values with an error between a second de-compressed pixel value and the input pixel values, wherein the first multiplexer is to select and output a compressed pixel value from one of the first or second block encoders that provides a predetermined error.

14. The device as claimed in claim 13, wherein:
the first de-compressed pixel value is to be compressed and de-compressed through the first block encoder, and
the second de-compressed pixel value is to be compressed and de-compressed through the second block encoder.

15. The device as claimed in claim 11, wherein the first block encoder is to quantize a difference between the second input pixel value and a reference pixel value.

16. The device as claimed in claim 15, wherein the reference pixel value includes a de-compressed pixel value obtained by de-compressing the first compressed pixel value.

17. The device as claimed in claim 11, wherein the first block encoder is to directly quantize the second input pixel value.

18. The device as claimed in claim 11, wherein the first block encoder includes:
a plurality of first encoders to compress the second input pixel value in different ways, and to output the compressed results as second compressed pixel values; and
a second multiplexer to calculate errors between second de-compressed pixel values and the second input pixel values, to compare the errors, and to select and output a second compressed pixel value output from one of the first encoders providing a predetermined error.

19. The device as claimed in claim 18, wherein the de-compressed pixel values are to be generated by de-compressing the second compressed pixel values.

20. The device as claimed in claim 11, wherein:
the first position is at a head position of the block, and
the second position is after the first position within the block.

* * * * *